United States Patent
Hirota et al.

(10) Patent No.: US 7,394,831 B2
(45) Date of Patent: Jul. 1, 2008

(54) METHOD FOR TIME-DIVISION MULTIPLEXING

(75) Inventors: Masaki Hirota, Kawasaki (JP); Haruo Yamashita, Kawasaki (JP); Tomohiro Shinomiya, Kawasaki (JP); Nagao Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 976 days.

(21) Appl. No.: 10/090,019

(22) Filed: Feb. 25, 2002

(65) Prior Publication Data

US 2002/0093987 A1    Jul. 18, 2002

Related U.S. Application Data

(63) Continuation of application No. PCT/JP99/04772, filed on Sep. 2, 1999.

(51) Int. Cl.
 *H04J 3/06* (2006.01)
(52) U.S. Cl. .................................................. 370/509
(58) Field of Classification Search ................ 370/503, 370/304, 498, 442, 94.1, 94.2, 94.3, 85.13, 370/85.14, 110.1, 24, 85.3, 31, 85.1, 79, 370/85.5, 14, 13, 215, 509–514, 537, 539, 370/535, 244, 366, 395.62, 520, 507; 375/354, 375/121, 8, 22, 368, 365, 366; 381/58, 56; 327/172, 31, 398; 340/825.5, 825.51, 825.54, 340/825.06, 825.07, 825.76, 318
See application file for complete search history.

(56) References Cited

U.S. PATENT DOCUMENTS

| | | | | |
|---|---|---|---|---|
| 3,566,038 | A | * 2/1971 | Slavin | 370/535 |
| 3,585,307 | A | * 6/1971 | Greenberg | 370/244 |
| 3,777,184 | A | * 12/1973 | Smith | 327/172 |
| 3,804,985 | A | * 4/1974 | Matsuo | 370/215 |
| 3,856,996 | A | * 12/1974 | Greenberg | 381/58 |
| 4,748,623 | A | * 5/1988 | Fujimoto | 370/513 |
| 5,680,246 | A | * 10/1997 | Takahashi et al. | 359/341.43 |

(Continued)

FOREIGN PATENT DOCUMENTS

JP  01-157138  6/1989

(Continued)

OTHER PUBLICATIONS

European Search Report—May 3, 2005.

*Primary Examiner*—Chau T. Nguyen
*Assistant Examiner*—Donald L Mills
(74) *Attorney, Agent, or Firm*—Katten Muchin Rosenman LLP

(57) ABSTRACT

A method for time-division multiplexing including steps of generating a plurality of first signals and a plurality of second signals to which specific pulse trains for frame synchronization are allocated respectively; generating low speed signals of plural channels including the first and second signals and transmission signals; a conversion step; and time-division multiplexing the low speed signals after the conversion step, thereby obtaining high speed signals. When applied to SDH, for example, the first and second signals may be A1 bytes and A2 bytes respectively, and the transmission signals may ho payload signals. According to one aspect of the invention, at the conversion step, the first and second signals in each channel are panty convened into either of "1/0" alternating signals and "0/1" alternating signals. Consequently, it becomes possible to reduce the number of successive same code and to diminish the deviation of the mark rate.

8 Claims, 22 Drawing Sheets

U.S. PATENT DOCUMENTS

| | | | |
|---|---|---|---|
| 5,710,774 A * | 1/1998 | Suh et al. ............... | 370/513 |
| 5,739,932 A * | 4/1998 | Tomooka et al. ......... | 398/31 |
| 6,385,213 B1 | 5/2002 | Nakamura et al. | |
| 6,671,760 B1 * | 12/2003 | Kawasaki et al. ......... | 710/106 |

FOREIGN PATENT DOCUMENTS

| | | |
|---|---|---|
| JP | 05-292050 | 11/1993 |
| JP | 05-308335 | 11/1993 |
| JP | 05292050 | 11/1993 |
| JP | 05292050 A * | 11/1993 |
| JP | 10150423 | 6/1998 |
| JP | 10-303842 | 11/1998 |

* cited by examiner

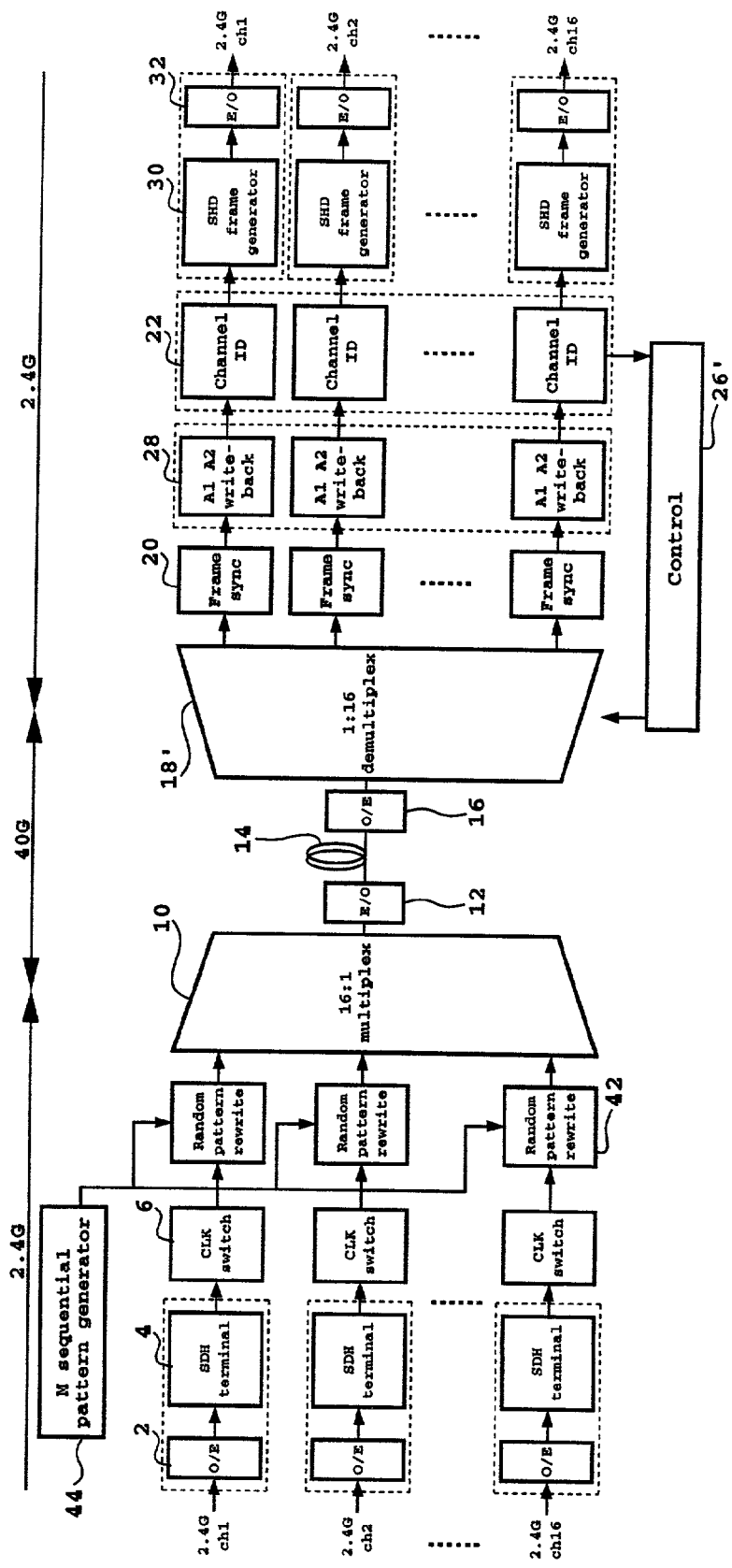
F I G. 16

METHOD FOR TIME-DIVISION MULTIPLEXING

This application is a continuation of international application No. PCT/JP99/04772, filed Sep. 2, 1999, pending.

BACKGROUND OF THE INVENTION

1. Field of the Invention

The present invention relates to a method for time-division multiplexing adapted for SDH (synchronous digital hierarchy).

2. Description of the Related Art

The SDH, which is the basis of a broadband ISDN, is a hierarchy achieved through global unification of communication speed series by grouping a multiplicity of 64-kbps signals into some stages of various rates. More specifically, the SDH prescribes the interface to effectively multiplex a variety of high speed services and also the existing low speed services, and it was standardized in conformity with CCITT (present ITU-T) in November, 1988. The features of such multiplexing include that a fundamental transmission rate is set to 155.52 Mbps (termed STM-1 level) on premise that the network frequency is in synchronism, and a transmission rate of N×155.52 Mbps, which is an integral multiple of the fundamental rate, is used. For example, there are prescribed as N=1, 4 and 16, i.e., 155.52 Mbps (STM-1), 622.08 Mbps (STM-4), and 2.48832 Gbps (STM-16). The maximum SDH multiplexing rate standardized at present is 10 Gbps. However, with the recent rapid increase of the amount of the information in the latest data communications, it is highly demanded to realize higher rate communications in the basic transmitting equipment. For example, a transmission rate of 40 Gbps can be achieved in practical use by time-division multiplexing 16-channel SDH signals each of 2.4 Gbps (STM-16).

A frame structure at STM-1 is composed of a two-dimensional byte array with 9 rows and 270 columns. Bytes in the first 9 rows and 9 columns (except 4th row), are termed a section overhead (SOH) including frame sync signal, maintenance information, state monitor and other information. The first 4th-row byte is termed an AU-pointer which indicates the top position of main information. The 9 rows and 261 columns except the SOH and the AU-pointer are termed a payload where main information is stored.

In an SDH frame overhead, there are prepared two patterns termed an A1 byte ("11110110") and an A2 byte ("00101000") for synchronizing the frame. In an SDH frame of 2.4 Gbps, 48 A1 bytes and 48 A2 bytes are arrayed successively. And a channel identification byte termed a J0 byte is prepared next to the A1 and A2 bytes.

Now a consideration will be given on an exemplary case of producing 40-Gbps signals by time-division multiplexing such 2.4-Gbps SDH frames of 16 channels simply by bit interleave while disregarding the respective frame phases of the channels. In this case, there exists a possibility that the entire SDH frames of 16 channels may be multiplexed in the same phase, whereby in the A1-byte and A2-byte portions of the SDH overhead, 64 successive "1" bits are arrayed in the A1 byte multiplexed area, and 80 successive "0" bits are arrayed in the A2 byte multiplexed area (1536 bytes=96×16 channels). Meanwhile the mark rate in the A1 byte area is 0.75, and the mark rate in the A2 byte area is 0.25 (which will be described in detail later).

Such long successions of the same code or such deviations of the mark rate may cause harmful influence on both a transmitter and a receiver in any extremely fast transmission performed at a high transmission rate of 40 Gbps or so. For example, in an optical receiving module, its clock reproduction capability is deteriorated essentially by long successions of the same code or deviations of the mark rate.

It is therefore an object of the present invention to provide an improved time-division multiplexing method which is capable of reducing the number of successive same code and diminishing the deviation of the mark rate.

SUMMARY OF THE INVENTION

According to the present invention, there is provided a method for time-division multiplexing. This method comprises a step of generating a plurality of first signals and a plurality of second signals to which specific pulse trains for frame synchronization are allocated respectively; a step of generating low speed signals of plural channels including the first signals, the second signals and transmission signals; a conversion step; and a step of producing high speed signals by time-division multiplexing the low speed signals after completion of the conversion step.

When the present invention is applied to SDH for example, the first and second signals may be composed of A1 bytes and A2 bytes respectively, and the transmission signals may be composed of payload signals.

The conversion step will be explained below more specifically in accordance with various aspects of the present invention.

According to a first aspect of the invention, at the conversion step, the first and second signals in each channel are partly converted into either of "1/0" alternating signals and "0/1" alternating signals.

According to a second aspect of the invention, at the conversion step, the first and second signals in either of each odd channel and each even channel are partly converted into "1/0" alternating signals, while the first and second signals in the other channels are partly converted into "0/1" alternating signals.

According to a third aspect of the invention, at the conversion step, the first and second signals in either of each odd channel and each even channel are partly converted into all "0" signals, while the first and second signals in the other channels are partly converted into all "1" signals.

According to a fourth aspect of the invention, at the conversion step, the first and second signals in either of each odd channel and each even channel are partly converted into inverted signals.

According to a fifth aspect of the invention, at the conversion step, the first and second signals in each channel are partly converted into random patterns.

According to a sixth aspect of the invention, at the conversion step, the first and second signals in either of each odd channel and each even channel are partly converted into random patterns, while the first and second signals in the other channels are converted into inverted random patterns. The inverted random patterns are obtained by inverting the random patterns.

According to a seventh aspect of the invention, the conversion step comprises a step of generating a random pattern and then dividing one period of such a random pattern by the number of plural channels to thereby obtain a plurality of different random patterns; and a step of partly converting the first and second signals in each channel into each of the plural different random patterns.

And according to an eighth aspect of the invention, at the conversion step, the first and second signals in either of each odd channel and each even channel are entirely converted into inverted signals.

Thus, the time-division multiplexing method of the invention comprises a step of partial or entire conversion of the first and second signals, hence reducing the number of successive same code and diminishing the deviation of the mark rate.

It is desired that the first and second signals converted partly or entirely according to the various aspects of the present invention are reconverted or descrambled into the original signals when received.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 16 is a block diagram of a substitute for the hardware shown in FIG. 15;

DETAILED DESCRIPTION OF THE PREFERRED EMBODIMENTS

Figure 1:
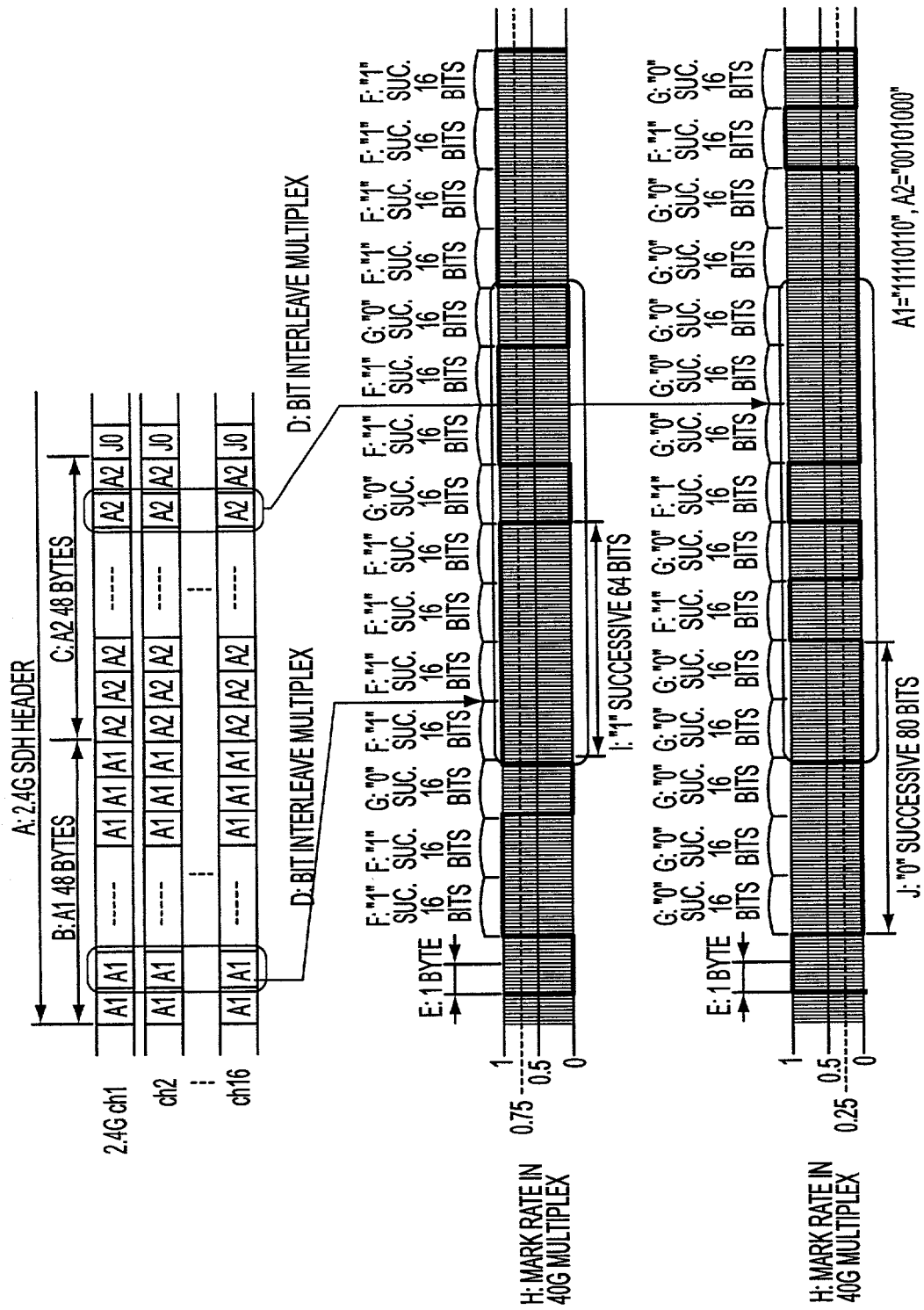
FIG. 1 shows how A1 bytes and A2 bytes of SDH are arrayed when multiplexed by 1:16 bit interleave.

Hereinafter some preferred embodiments of the present invention will be described in detail with reference to the accompanying drawings. Any mutually corresponding component parts in the drawings are denoted by like or similar reference numerals.

Referring first to FIG. 1, A1 bytes and A2 bytes of SDH are arrayed in this state when multiplexed by 1:16 bit interleave. In an upper portion of FIG. 1, there is shown a frame structure of a section overhead of premultiplex signals (low speed signals) of 1st channel (ch1) to 16th-channel (ch16) at 2.4 Gbps. The low speed signals include, in addition to the section overhead, transmission signals contained in a payload. Each section overhead includes 48 A1 bytes (plural first signals) to which a specific pulse train "11110110" for frame synchronization is allocated, 48 A2 bytes (plural second signals) to which a specific pulse train "100101000" for frame synchronization is allocated, and a J0 byte for channel identification.

In the case of generating 40-Gbps high speed signals by time-division multiplexing such low speed signals of 16 channels simply by bit interleave while disregarding the respective frame phases of the channels, there exists a possibility that, as mentioned previously, the entire SDH frames of the 16 channels are multiplexed in the same phase. In this case, with regard to the A1 and A2 bytes of the multiplexed high speed signals, 64 "1" bits are successive in the area of the multiplexed A1 bytes, and 80 "0" bits are successive in the area of the multiplexed A2 bytes (1536 bytes=96×16 channels). The mark rate in the A1-byte area is 0.75, and the mark rate in the A2-byte area is 0.25.

Thus, when the low speed signals of 16 channels are time-division multiplexed by bit interleave to obtain high speed signals in disregard of the respective frame phases, there may occur long successions of the same code or deviations of the mark rate, whereby the transmission quality may be deteriorated in extremely fast , transmission as 40 Gbps or so.

Figure 2:
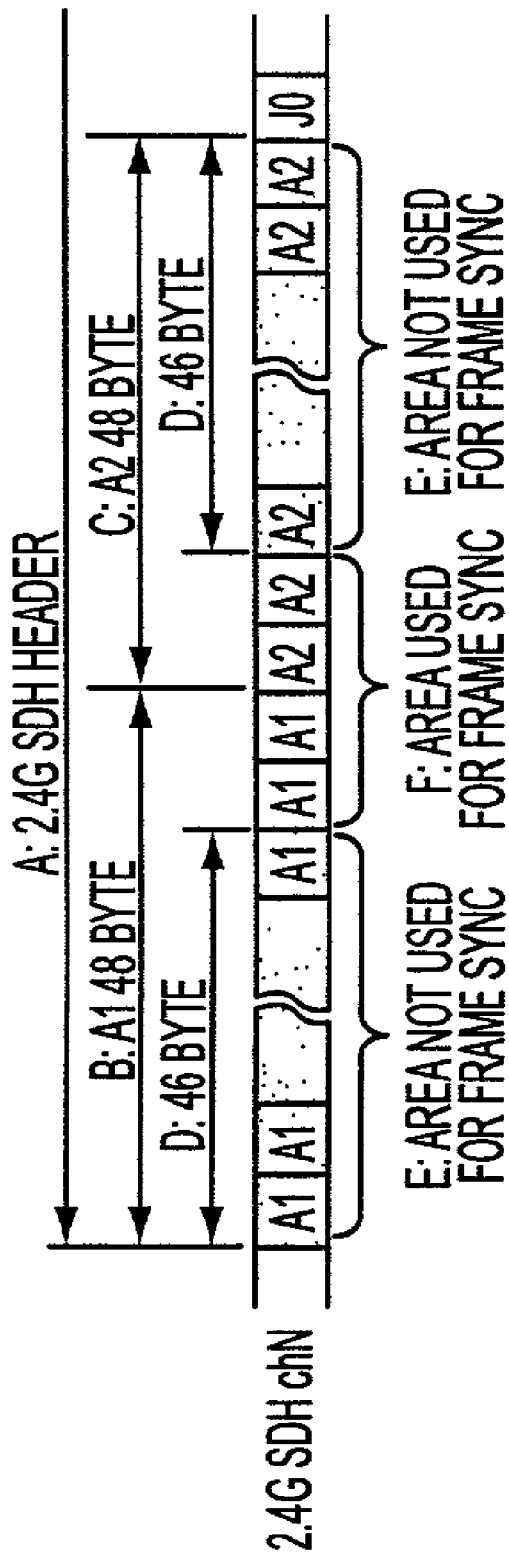
FIG. 2 is a diagram for explaining an SDH header (section overhead) in SDH at 2.4 Gbps.

When frame synchronization is performed in 2.4-Gbps SDH as shown in FIG. 2, out of 48 successive A1 bytes and 48 successive A2 bytes in an SDH header (section overhead), only 2 bytes (A1, A1) and 2 bytes (A2, A2) at the boundary therebetween are used for frame synchronization, while the remaining 46 A1 bytes and 46 A2 bytes are not used for frame synchronization. Therefore, such remaining 46 A1 bytes and 46 A2 bytes are converted into specific signals in accordance with the present invention, thereby reducing the number of successive same code and diminishing the deviation of the mark rate. Now a detailed explanation will be given below on various processes of conversion executed according to the present invention.

Figure 3:
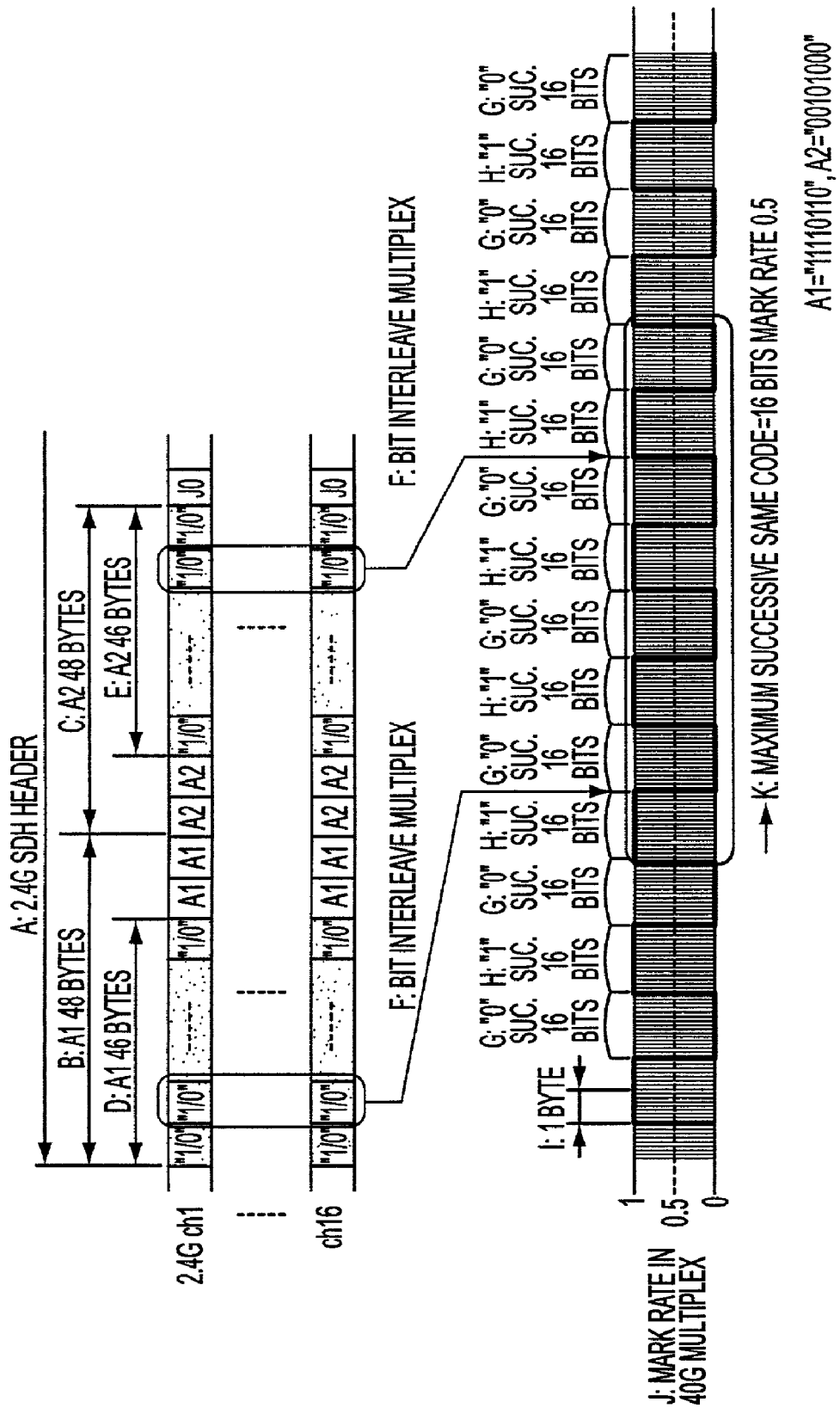
FIG. 3 is a waveform chart for explaining a first embodiment of a method conforming with the present invention.

FIG. 3 is a waveform chart for explaining a first embodiment of the method conforming with the present invention. In this embodiment, a plurality of first signals (48 A1 bytes) and a plurality of second signals (48 A2 bytes) in each channel of 2.4-Gbps low speed signals are partly converted into either of "1/0" alternating signals and "0/1" alternating signals.

More specifically, in the waveform chart of FIG. 3, 46 A1 bytes unnecessary for frame synchronization are converted into "1/0" alternating signals, and 46 A2 bytes unnecessary for frame synchronization are converted into "1/0" alternating signals. After such conversion, the low speed signals of 16 channels are time-division multiplexed by bit interleave, and high speed signals obtained as a result are transmitted via an optical fiber transmission line. Then on a receiving side, the signals are processed by 1:16 demultiplexing and, after frame synchronization in each channel, the alternating signals are reconverted or descrambled into the original A1 and A2 bytes.

Thus, according to the first embodiment shown in FIG. 3, the first and second signals in each channel are partly converted into either of "1/0" alternating signals and "0/1" alternating signals, hence reducing the number of successive same code and diminishing the deviation of the mark rate as well. Due to the conversion mentioned above, the mark rate can be rendered substantially steady to 0.5.

Figure 4:
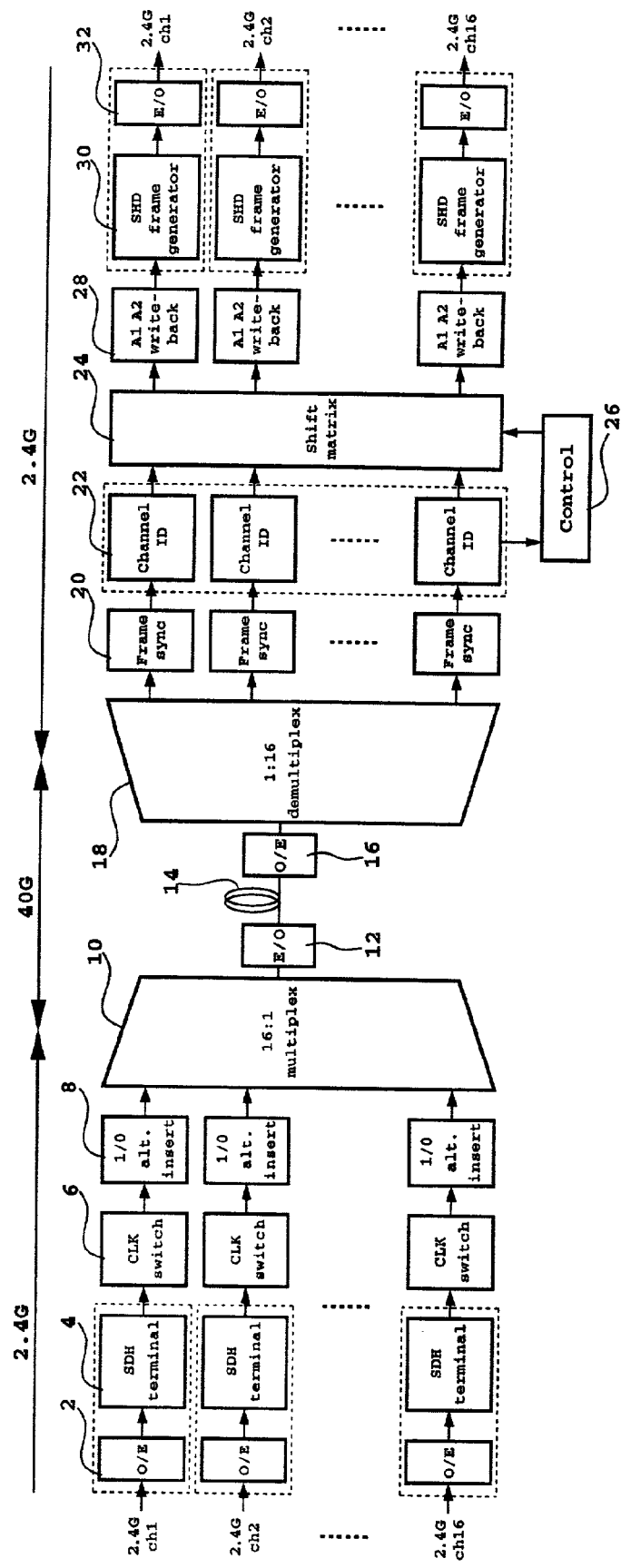
FIG. 4 is a block diagram of hardware adapted to carry out the first embodiment of the method conforming with the present invention.

Referring now to FIG. 4, there is shown hardware adapted to carry out the first embodiment which represents the method of the present invention described in connection with FIG. 3. Each of 16-channel transmission units for 2.4-Gbps low speed signals comprises an O/E converter 2 for converting 2.4-Gbps optical signals into electric signals, a SDH terminal circuit 4 supplied with the output of the converter 2, a clock (CLK) switching circuit 6 supplied with the output of the terminal circuit 4, and a 1/0 alternating signal insertion circuit 8 supplied with the output of the switching circuit 6. The 1/0 alternating signal insertion circuit 8 converts, e.g., 46 A1 bytes and 46 A2 bytes which are not necessary for frame synchronization as described, into "1/0" alternating signals.

The 16-channel low speed signals outputted from the 1/0 alternating signal insertion circuit 8 are time-division multiplexed by a multiplexer 10, so that 40-Gbps high speed signals are obtained therefrom. Then the high speed signals thus obtained are converted by an E/O converter 12 into 40-Gbps optical signals. And the converted optical signals are transmitted to the receiving side via an optical fiber transmission line 14.

On the receiving side, first the received high speed optical signals are converted by an O/E converter 16 into high speed electric signals. The output of the converter 16 is demultiplexed by a demultiplexer 18 into 2.4-Gbps low speed signals of 16 channels. The low speed signals in each channel thus obtained are supplied via a frame synchronizing circuit 20 and a channel identification circuit 22 to a shift matrix circuit 24. Each frame synchronizing circuit 20 performs frame synchronization of the low speed signals on the basis of two A1 bytes and two A2 bytes. Each channel identification circuit 22 identifies the relevant channel on the basis of a channel identification J0 byte. The shift matrix circuit 24 is under control of a control circuit 26 according to the sub-output of the channel identification circuit 22.

In this embodiment, the output of the frame synchronizing circuit 20 is indefinite to indicate that the low speed signal of which channel is outputted from which port. Therefore, the shift matrix circuit 24 controlled according to the output of the channel identification circuit 22 is so provided that the low speed signal of each channel can be outputted to a predetermined relevant port (interface).

The low speed signals of each channel outputted from the shift matrix circuit 24 are processed through an A1, A2 write-back circuit 28, an SDH frame generating circuit 30 and an E/O converter 32, which then outputs 2.4-Gbps low speed optical signals of each channel.

The write-back circuit 28 writes back the A1 and A2 bytes, which have been rewritten as "1/0" alternating signals by the 1/0 alternating signal insertion circuit 8 on the receiving side, to the original A1 and A2 bytes. In the embodiment shown in the diagram, the write-back circuit 28 is positioned posterior to the shift matrix circuit 24. However, the circuit 28 may be disposed in any other stage posterior to the frame synchronizing circuit 20.

The structure shown in FIG. 4 is capable of easily carrying out the time-division multiplexing method described above in connection with FIG. 3.

Figure 5:
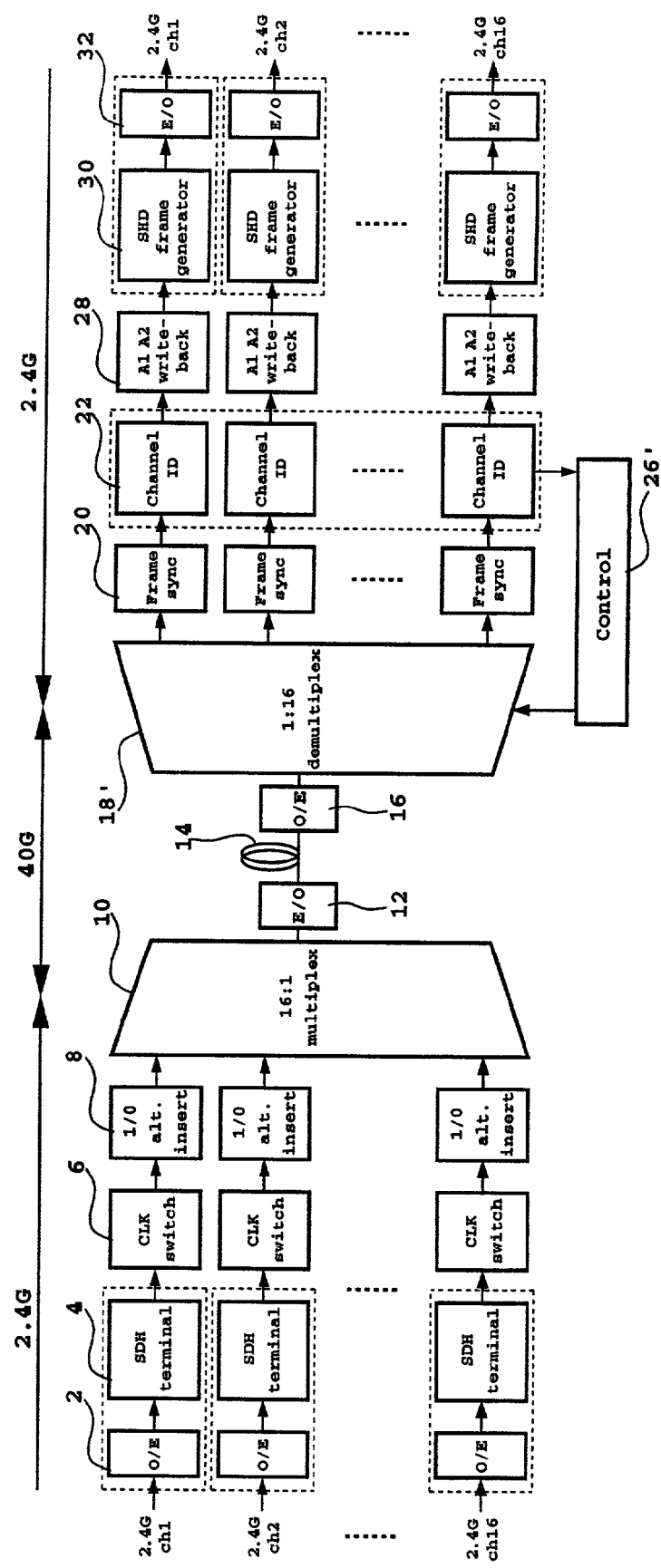
FIG. 5 is a block diagram of a substitute for the hardware shown in FIG. 4.

Referring next to FIG. 5, there is shown here a substitute for the hardware of FIG. 4. In this structure, the result of the channel identification obtained from the sub-output of the channel identification circuit 22 is fed back by a control circuit 26' to a demultiplexer 18', and low speed signals of each channel outputted from the demultiplexer 18' are delivered from an output port of a predetermined relevant demultiplexer 18'. As a result, the shift matrix circuit 24 shown in FIG. 4 is rendered unnecessary to consequently simplify the structure.

Figure 6:
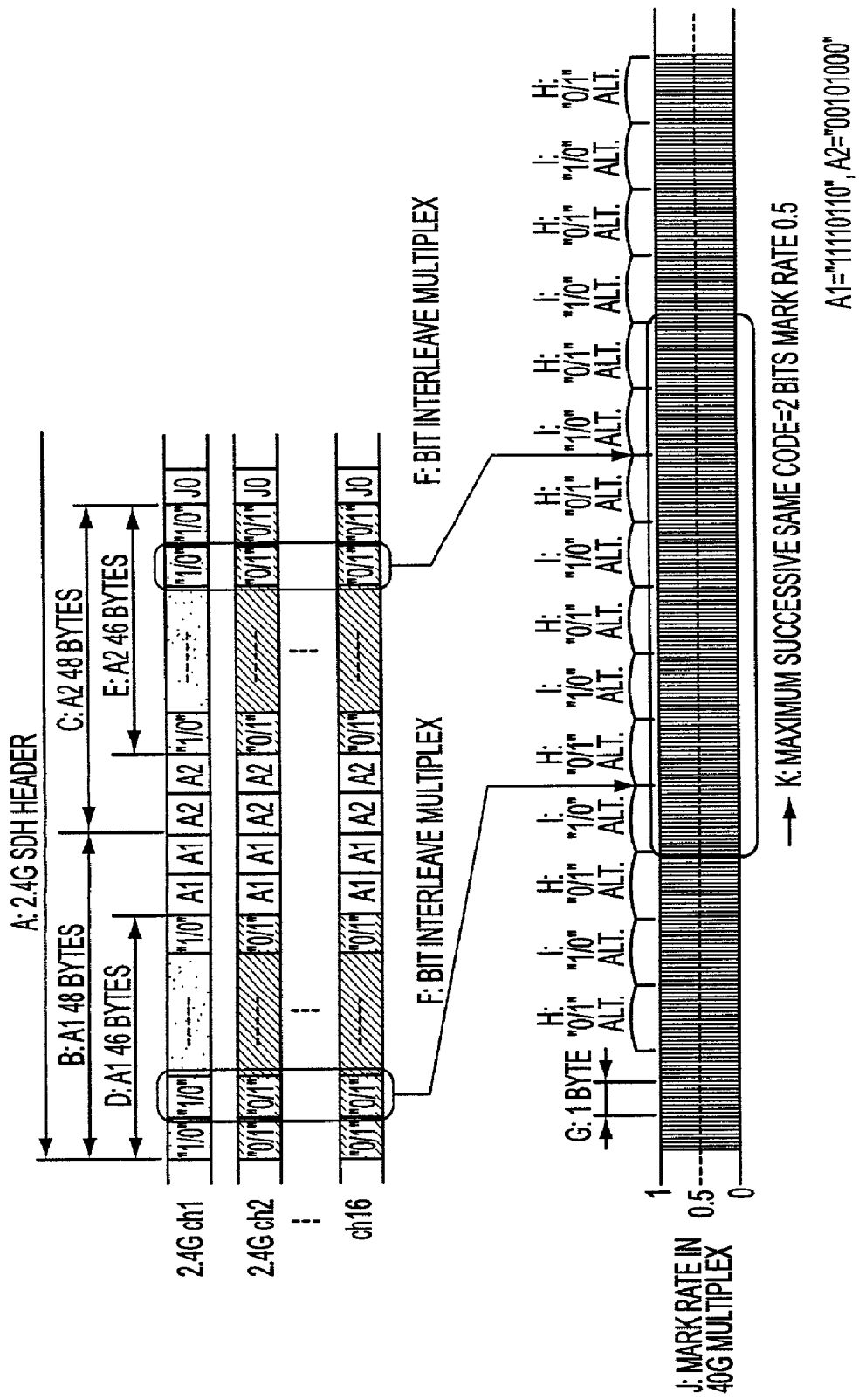
FIG. 6 is a waveform chart for explaining a second embodiment of the method conforming with the present invention.

FIG. 6 is a waveform chart for explaining a second embodiment of the method conforming with the present invention. In this embodiment, a plurality of first signals (48 A1 bytes) and a plurality of second signals (48 A2 bytes) in either of each odd channel and each even channel of 2.4-Gbps low speed signals are partly converted into "1/0" alternating signals, while the first signals and the second signals in the other channels are partly converted into "0/1" alternating signals.

More specifically, in the waveform chart of FIG. 6, 46 A1 bytes unnecessary for frame synchronization in each odd channel are converted into "1/0" alternating signals, and 46 A2 bytes unnecessary for frame synchronization in each odd channel are also converted into "1/0" alternating signals. Meanwhile 46 A1 bytes unnecessary for frame synchronization in each even channel are converted into "0/1" alternating signals, and 46 A2 bytes unnecessary for frame synchronization in each even channel are also converted into "0/1" alternating signals. After such conversion, the low speed signals of 16 channels are time-division multiplexed by bit interleave, and high speed signals obtained as a result are transmitted via an optical fiber transmission line for example. Then on the receiving side, the signals are processed by 1:16 demultiplexing and, after frame synchronization in each channel, the alternating signals are reconverted into the original A1 and A2 bytes.

Thus, according to the second embodiment shown in FIG. 6, the first and second signals in each odd channel are partly converted into "1/0" alternating signals, while the first and second signals in each even channel are partly converted into "0/1" alternating signals, hence reducing the number of successive same code and diminishing the deviation of the mark rate as well. Due to the conversion mentioned above, the mark rate can be rendered substantially steady to 0.5.

Figure 7:
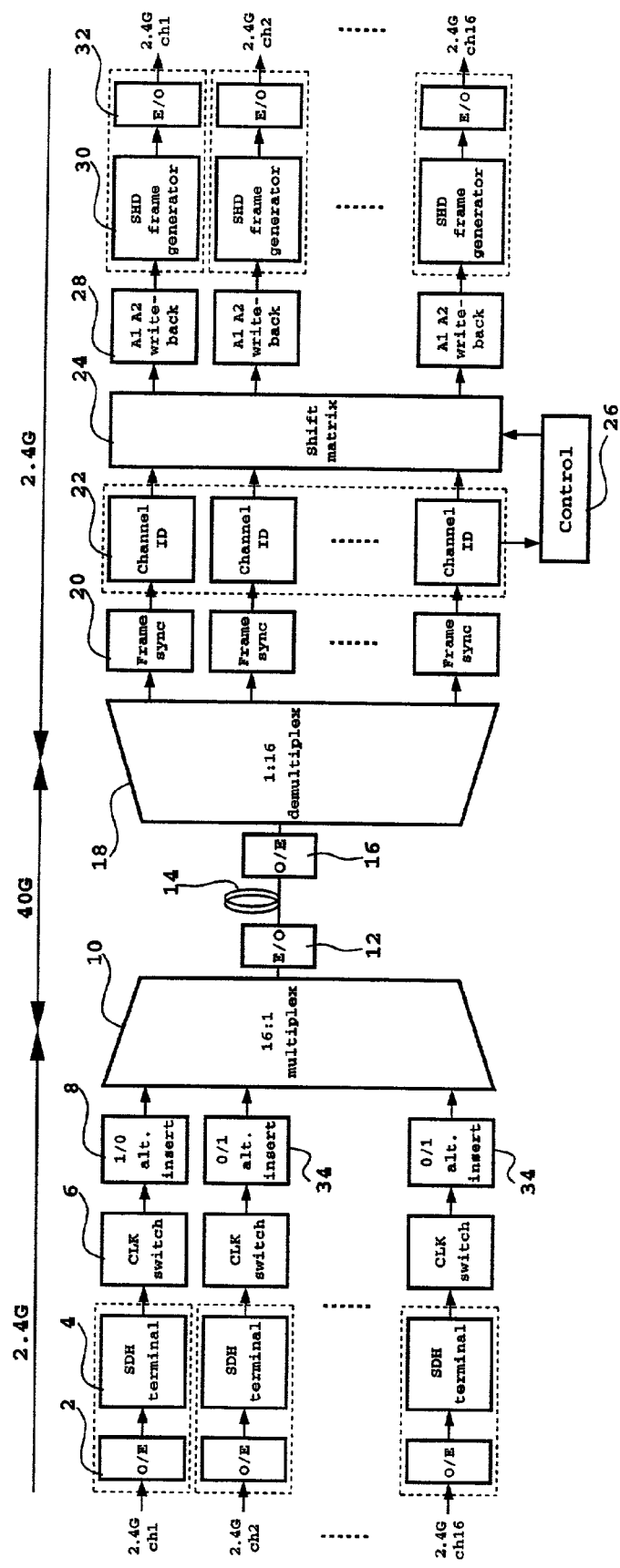
FIG. 7 is a block diagram of hardware adapted to carry out the second embodiment of the method conforming with the present invention.

Referring now to FIG. 7, there is shown hardware adapted to carry out the second embodiment which represents the method of the present invention described in connection with FIG. 6. In comparison with the hardware of FIG. 4, the 1/0 alternating signal insertion circuit 8 for each even channel is replaced with a 0/1 alternating signal insertion circuit 34. Therefore, the structure shown in FIG. 7 is capable of easily carrying out the time-division multiplexing method explained in connection with FIG. 6.

Figure 8:
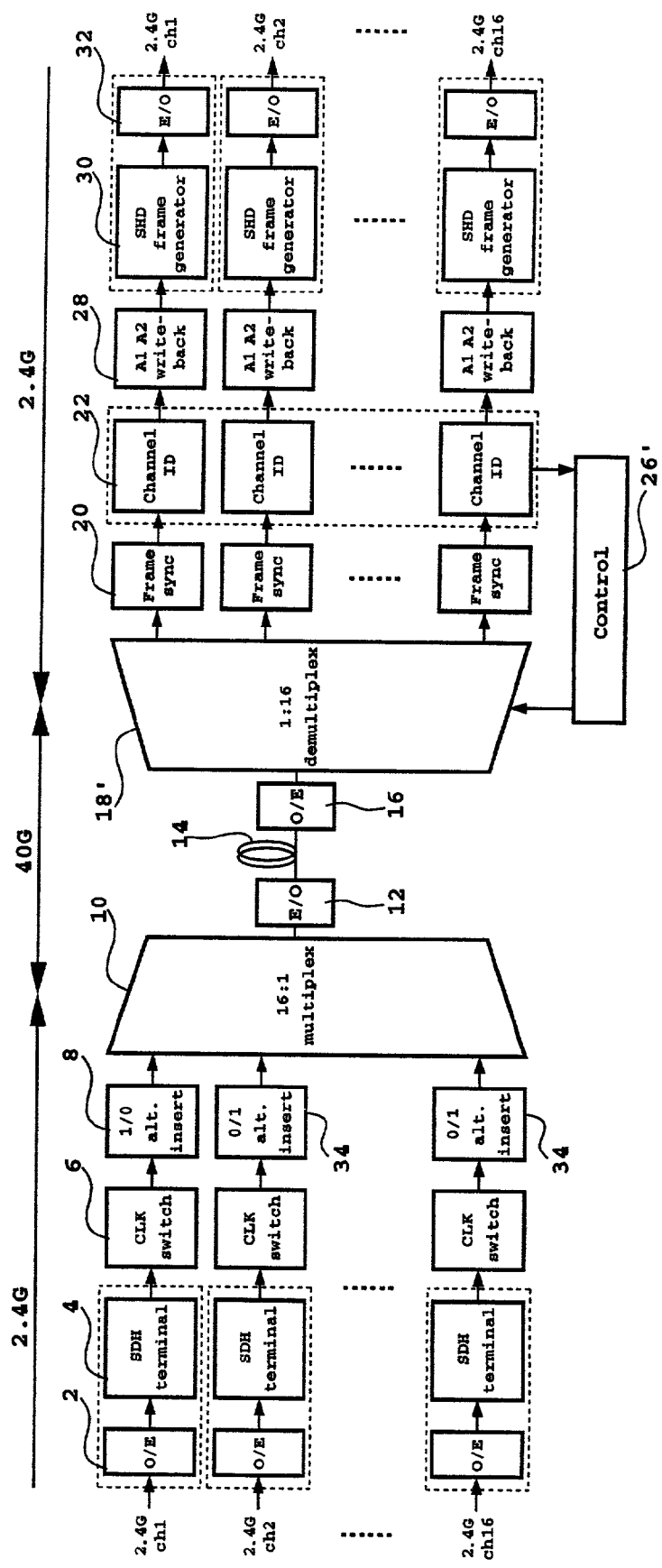
FIG. 8 is a block diagram of a substitute for the hardware shown in FIG. 7.

Referring next to FIG. 8, there is shown the structure of a substitute for the hardware shown in FIG. 7. In comparison with the hardware of FIG. 5, the 1/0 alternating signal insertion circuit 8 for each even channel is replaced with a 0/1 alternating signal insertion circuit 34. Therefore, the structure shown in FIG. 8 is capable of easily carrying out the time-division multiplexing method explained in connection with FIG. 6. Further, the structure can be more simplified since the shift matrix circuit 24 shown in FIG. 7 is no longer necessary.

Figure 9:
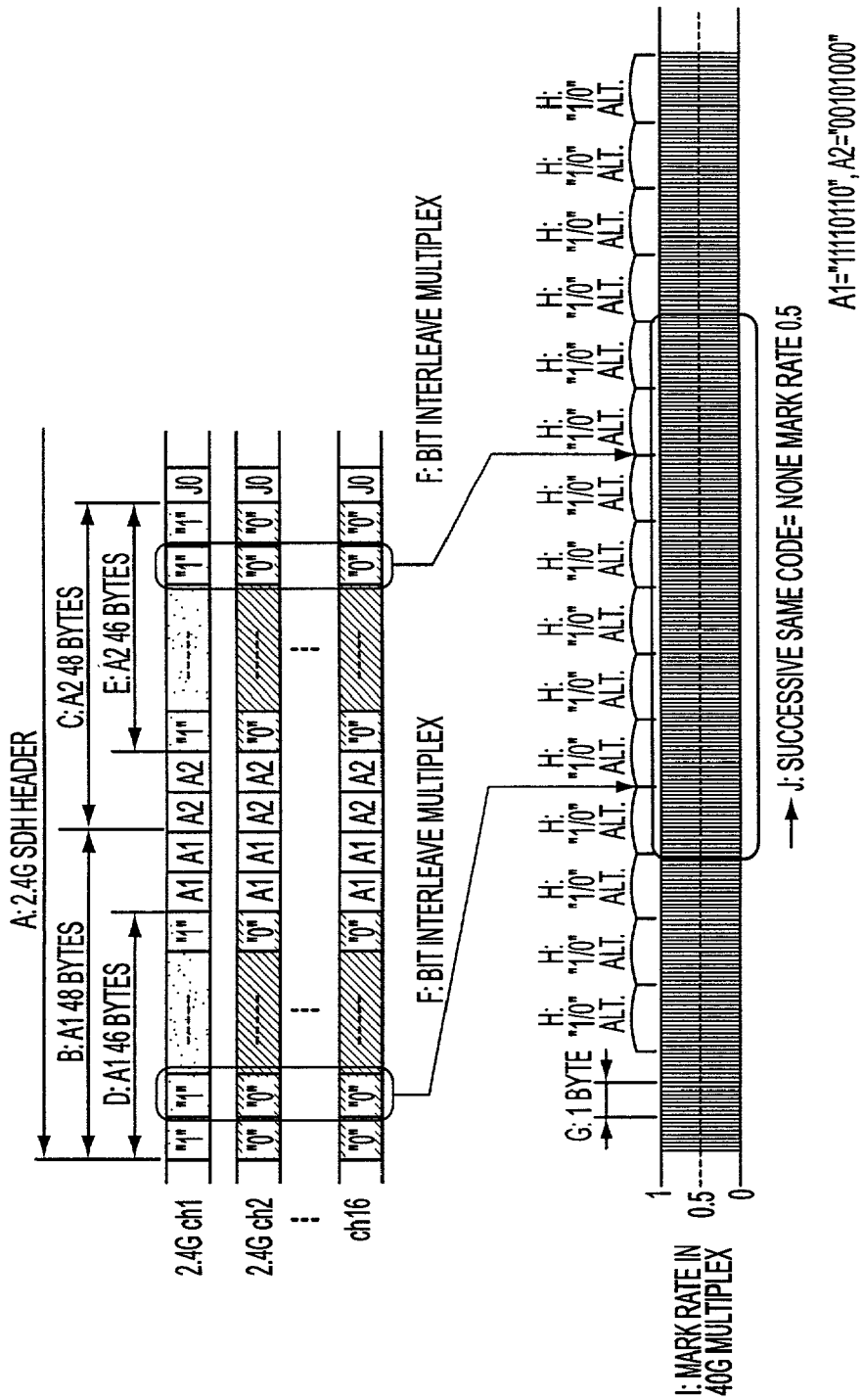
FIG. 9 is a waveform chart for explaining a third embodiment of the method conforming with the present invention.

FIG. 9 is a waveform chart for explaining a third embodiment of the method conforming with the present invention. In this embodiment, a plurality of first signals (48 A1 bytes) and a plurality of second signals (48 A2 bytes) in either of each odd channel and each even channel of 2.4-Gbps low speed signals are partly converted into all "0" signals, while the first signals and the second signals in the other each channel are partly converted into all "1" signals.

More specifically, in the waveform chart of FIG. 9, 46 A1 bytes unnecessary for frame synchronization in each odd channel are converted into all "1" signals, and 46 A2 bytes unnecessary for frame synchronization in each odd channel are also converted into all "1" signals. Meanwhile, 46 A1 bytes unnecessary for frame synchronization in each even channel are converted into all "0" signals, and 46 A2 bytes unnecessary for frame synchronization in each even channel are also converted into all "0" signals. After such conversion, the low speed signals of 16 channels are time-division multiplexed by bit interleave, and high speed signals obtained as a result are transmitted via an optical fiber transmission line for example. Then on the receiving side, the signals are processed by 1:16 demultiplexing and, after frame synchronization in each channel, the all "0" signals and the all "1" signals are reconverted into the original A1 and A2 bytes.

Thus, according to the third embodiment shown in FIG. 9, the first and second signals in either of each odd channel and each even channel are partly converted into all "0" signals, while the first and second signals in the other each channel are partly converted into all "1" signals, hence reducing the number of successive same codes and diminishing the deviation of the mark rate as well. Due to the conversion mentioned above, the mark rate can be rendered substantially steady to 0.5.

Figure 10:
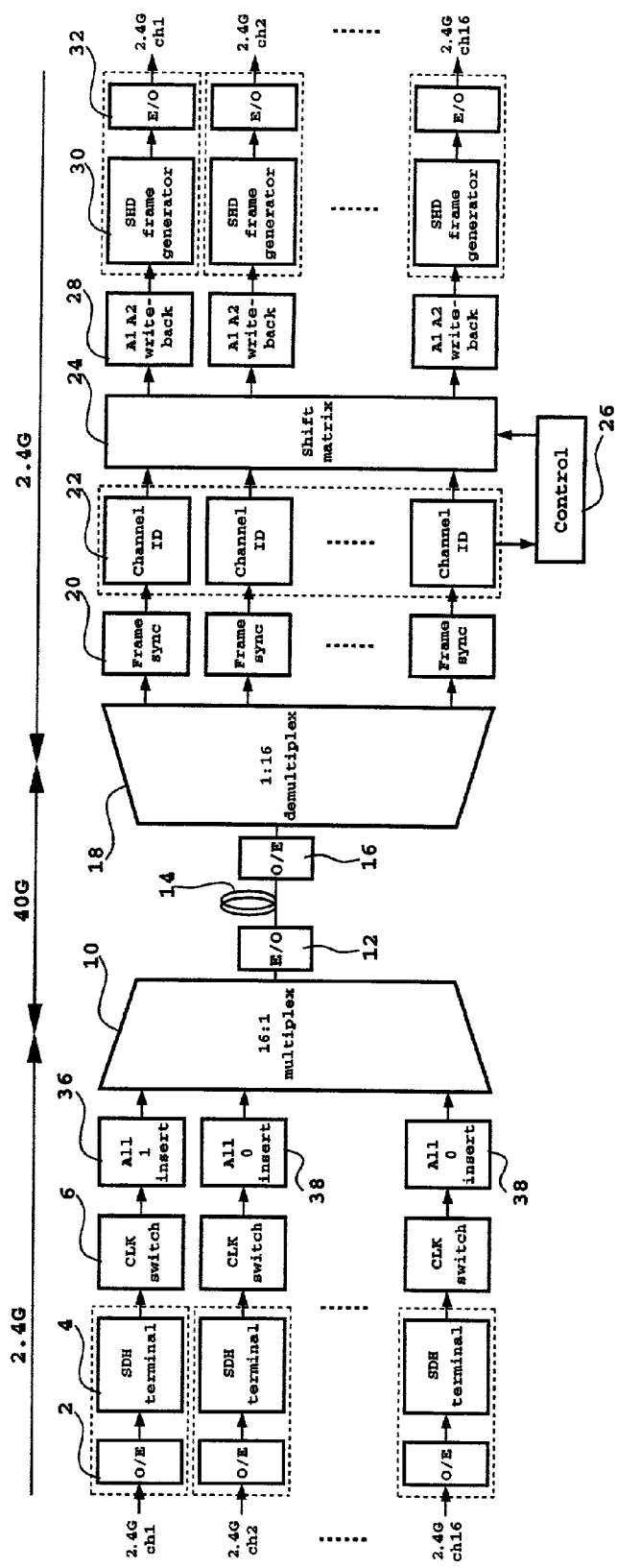
FIG. 10 is a block diagram of hardware adapted to carry out the third embodiment of the method conforming with the present invention.

Referring now to FIG. 10, there is shown hardware adapted to carry out the third embodiment which represents the method of the present invention described in connection with FIG. 9. In comparison with the hardware of FIG. 4, the 1/0 alternating signal insertion circuit 8 for each odd channel is replaced<with an all 1 signal insertion circuit 36, and the 1/0 alternating signal insertion circuit 8 for each even channel is replaced with an all 0 signal insertion circuit 38. Therefore, the structure shown in FIG. 10 is capable of easily carrying out the time-division multiplexing method explained in connection with FIG. 9.

Figure 11:
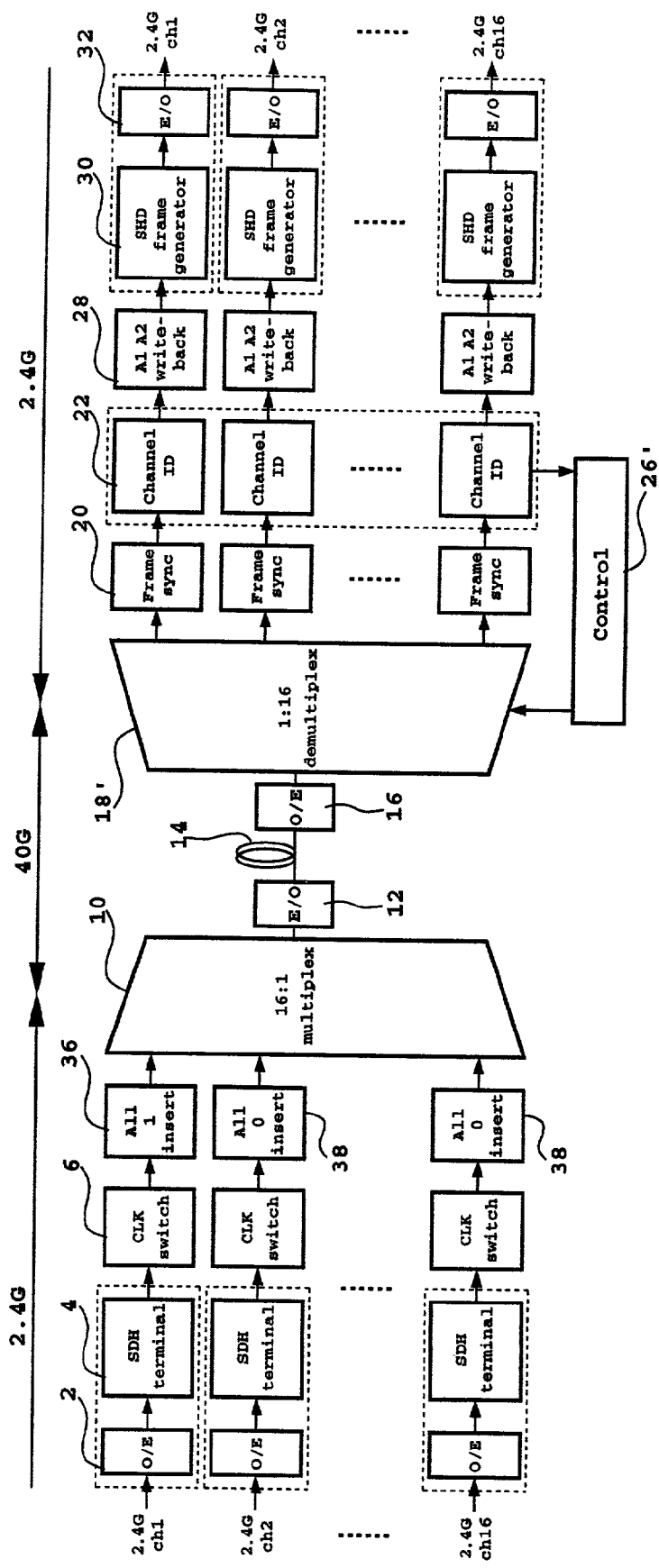
FIG. 11 is a block diagram of a substitute for the hardware shown in FIG. 10.

Referring next to FIG. 11, there is shown the structure of a substitute for the hardware shown in FIG. 10. In comparison with the hardware of FIG. 5, the 1/0 alternating signal insertion circuit 8 for each odd channel is replaced with an all 1 signal insertion circuit 36, and the 1/0 alternating signal insertion circuit 8 for each even channel is replaced with an all 0 signal insertion circuit 38. Therefore, the structure shown in FIG. 11 is capable of easily carrying out the time-division multiplexing method explained in connection with FIG. 9. Further, the structure can be more simplified since the shift matrix circuit 24 shown in FIG. 10 is no longer necessary.

Figure 12:
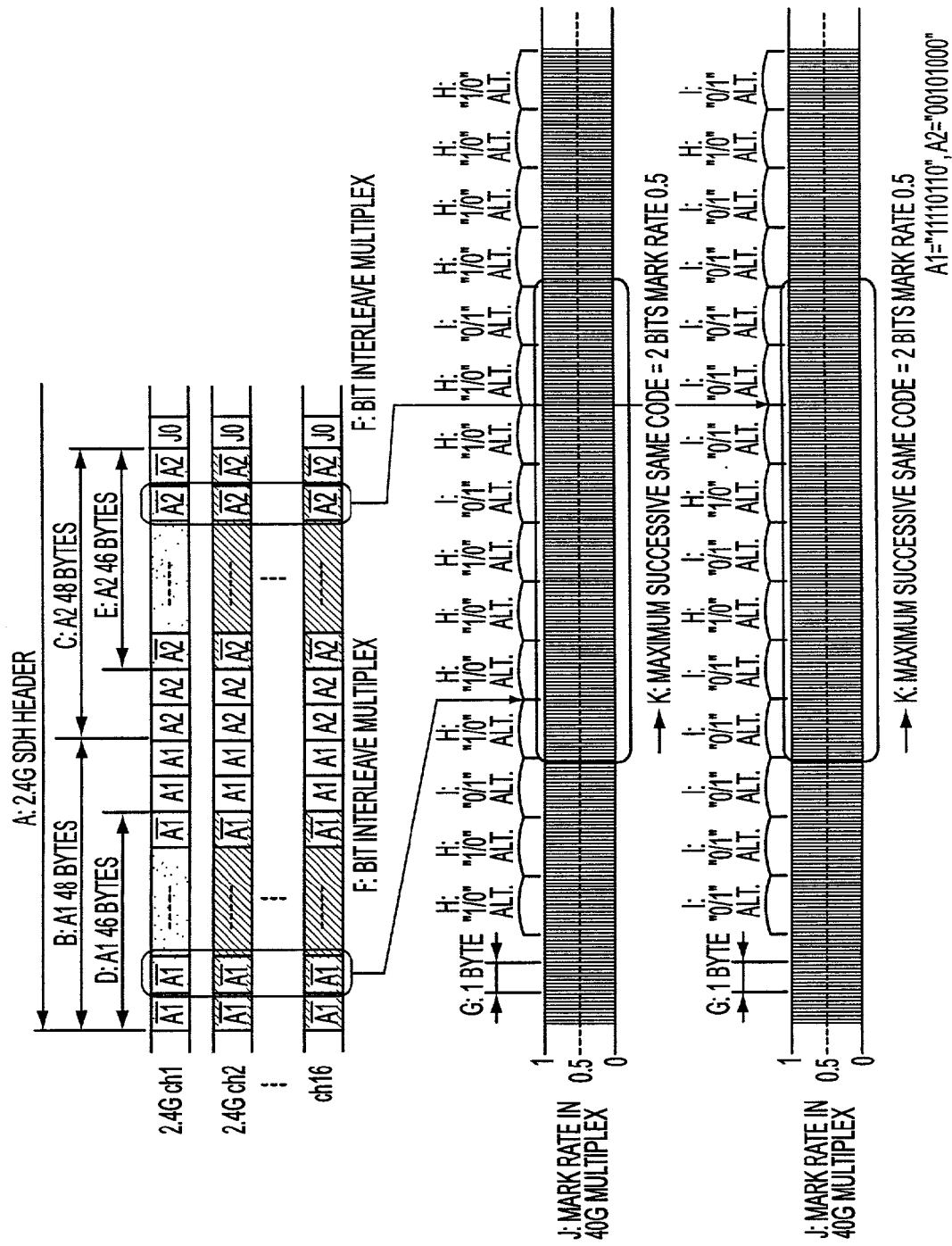
FIG. 12 is a waveform chart for explaining a fourth embodiment of the method conforming with the present invention.

FIG. 12 is a waveform chart for explaining a fourth embodiment of the method conforming with the present invention. In this embodiment, a plurality of first signals (48 A1 bytes) and a plurality of second signals (48 A2 bytes) in either of each odd channel and each even channel of 2.4-Gbps low speed signals are partly converted into inverted signals.

More specifically, in the waveform chart of FIG. 12, 46 A1 bytes unnecessary in each even channel for frame synchronization are converted into inverted signals, while 46 A2 bytes unnecessary in each even channel for frame synchronization are converted into inverted signals. After such conversion, the low speed signals of 16 channels are time-division multiplexed by bit interleave, and high speed signals obtained as a result are transmitted via an optical fiber transmission line for example. Then on the receiving side, the signals are processed by 1:16 demultiplexing and, after frame synchronization in each channel, the inverted signals are reconverted into the original A1 and A2 bytes.

Thus, according to the fourth embodiment shown in FIG. 12, the first and second signals in either of each odd channel and each even channel are partly converted into inverted signals, hence reducing the number of successive same code and diminishing the deviation of the mark rate as well. Due to the conversion mentioned above, the mark rate can be rendered substantially steady to 0.5.

Figure 13:
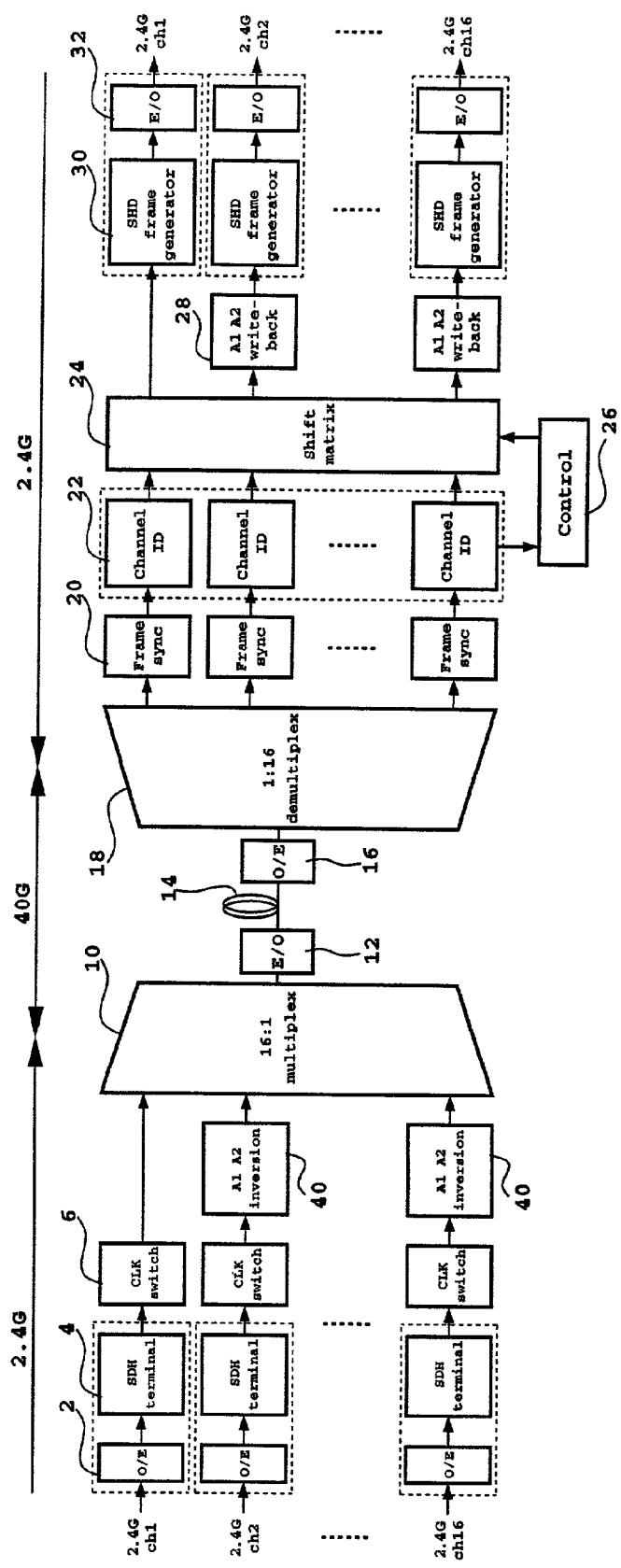
FIG. 13 is a block diagram of hardware adapted to carry out the fourth embodiment of the method conforming with the present invention.

Referring now to FIG. 13, there is shown hardware adapted to carry out the fourth embodiment which represents the method of the present invention described in connection with FIG. 12. In comparison with the hardware of FIG. 4, the 1/0 alternating signal insertion circuit 8 and the write-back circuit 28 for each odd channel are eliminated, and the 1/0 alternating signal insertion circuit 8 for each even channel is replaced with an A1, A2 inversion circuit 40. Therefore, the structure shown in FIG. 13 is capable of easily carrying out the time-division multiplexing method explained in connection with FIG. 12.

Figure 14:
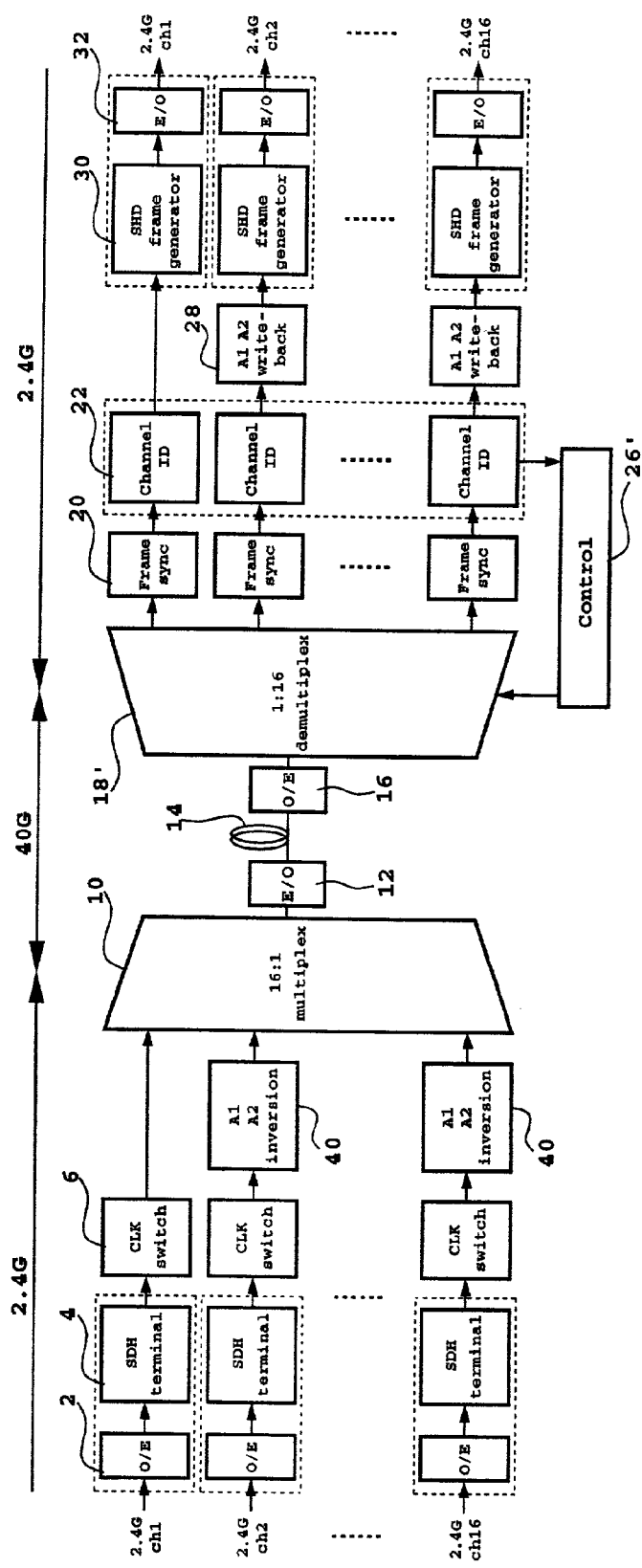
FIG. 14 is a block diagram of a substitute for the hardware shown in FIG. 13.

Referring next to FIG. 14, there is shown the structure of a substitute for the hardware shown in FIG. 13. In comparison with the hardware of FIG. 5, the 1/0 alternating signal insertion circuit 8 and the write-back circuit 28 for each odd channel are eliminated, and the 1/0 alternating signal insertion circuit 8 for each even channel is replaced with the A1, A2 inversion circuit 40. Therefore, the structure shown in FIG. 14 is capable of easily carrying out the time-division multiplexing method explained in connection with FIG. 12. Further, the structure can be more simplified since the shift matrix circuit 24 shown in FIG. 13 is no longer necessary.

Figure 15:
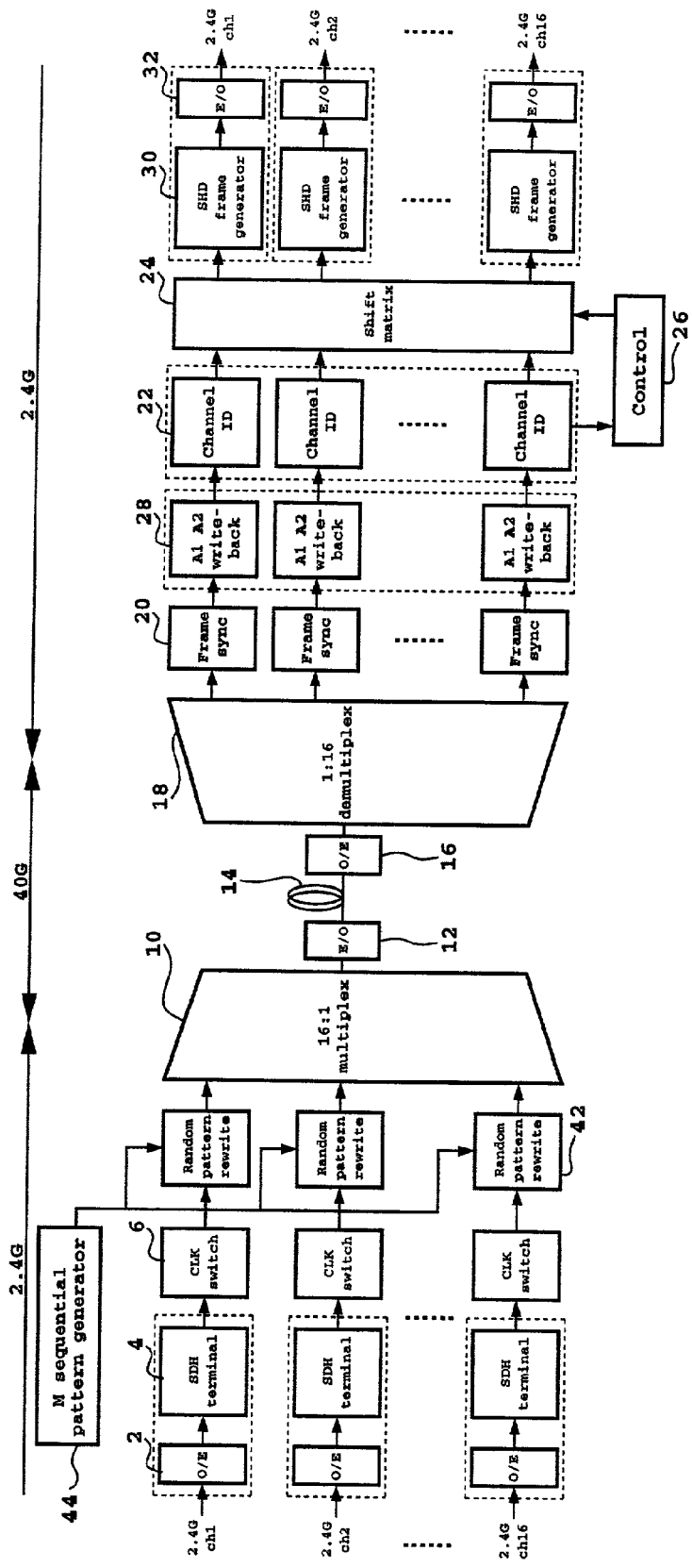
FIG. 15 is a block diagram of hardware adapted to carry out a fifth embodiment of the method conforming with the present invention.

Referring to FIG. 15, there is shown another example of hardware adapted to carry out a fifth embodiment which represents the method of the present invention. In comparison with the hardware of FIG. 4, the 1/0 alternating signal insertion circuit 8 is replaced with a random pattern rewrite circuit 42, and an M sequential pattern generator circuit 44 to be connected to the rewrite circuit 42 is provided additionally.

In the fifth embodiment, a plurality of first signals (48 A1 bytes) and a plurality of second signals (48 A2 bytes) in each channel of 2.4-Gbps low speed signals are partly converted into random patterns.

And after each conversion, the low speed signals of 16 channels are time-division multiplexed by bit interleave, and high speed signals obtained as a result are transmitted via an optical fiber transmission line 14. Then on the receiving side, the signals are processed by 1:16 demultiplexing and, after frame synchronization in each channel, the random patterns are reconverted (descrambled) into the original A1 and A2 bytes.

Thus, according to the fifth embodiment, the first and second signals of each channel are partly converted into random patterns, hence reducing the number of successive same code and diminishing the deviation of the mark rate as well. Due to the conversion mentioned above, the mark rate can be rendered substantially steady to 0.5.

In the hardware of FIG. 15, an A1, A2 write-back circuit 28 is provided between a frame synchronizing circuit 20 and a channel identification circuit 22.

Referring next to FIG. 16, there is shown the structure of a substitute for the hardware shown in FIG. 15. In comparison with the hardware of FIG. 5, the 1/0 alternating signal insertion circuit 8 is replaced with a random pattern rewrite circuit 42, and an M sequential pattern generator circuit 44 to be connected to the rewrite circuit 42 is provided additionally. And an A1, A2 write-back circuit 28 is provided between a frame synchronizing circuit 20 and a channel identification circuit 22.

Thus, according the structure shown in FIG. 16, it becomes possible to easily carry out the time-division multiplexing method represented by the fifth embodiment of the present invention. Further, the structure can be more simplified since the shift matrix circuit 24 shown in FIG. 15 is no longer necessary.

Figure 17:
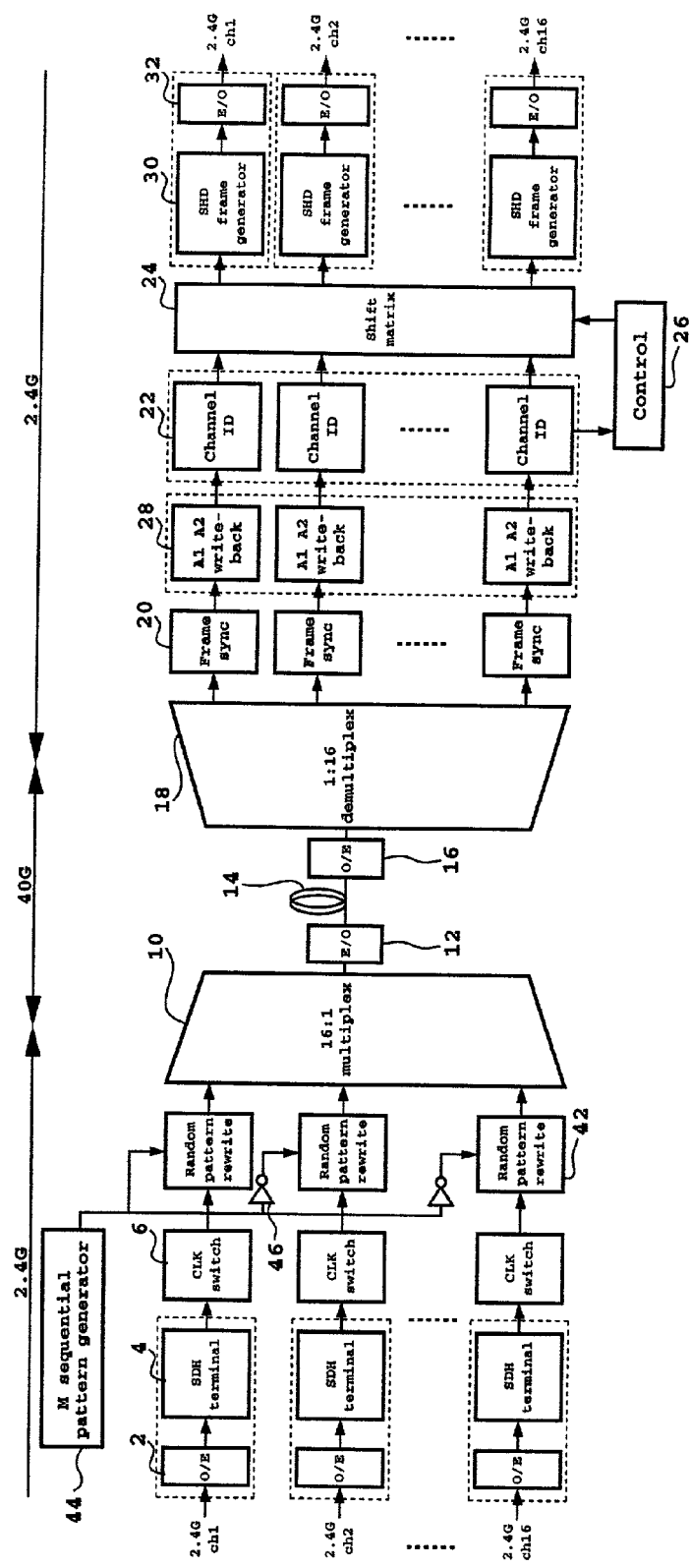
FIG. 17 is a block diagram of hardware adapted to carry out a sixth embodiment of the method conforming with the present invention.

Referring to FIG. 17, there is shown another example of hardware adapted to carry out a sixth embodiment which represents the method of the present invention. In comparison with the hardware of FIG. 15, an inverter 46 for each even channel is provided additionally between a random pattern rewrite circuit 42 and an M sequential pattern generator circuit 44.

In the sixth embodiment, a plurality of first signals (48 A1 bytes) and a plurality of second signals (48 A2 bytes) in either of each odd channel and each even channel of 2.4-Gbps low speed signals are partly converted into random patterns, while the first signals and the second signals in the other channels are partly converted into inverted random patterns.

More specifically, according to the hardware shown in FIG. 17, 46 A1 bytes unnecessary in each odd channel for frame synchronization are converted into random patterns, and 46 A2 bytes unnecessary in each odd channel for frame synchronization are converted also into random patterns. Meanwhile, 46 A1 bytes unnecessary in each even channel for frame synchronization are converted into inverted random patterns, and 46 A2 bytes unnecessary in each even channel for frame synchronization are converted also into inverted random patterns. The inverted random patterns are obtained by inverting the random patterns by the inverter 46. After such conversion, the low speed signals of 16 channels are time-division multiplexed by bit interleave, and high speed signals obtained as a result are transmitted via an optical fiber transmission line 14. Then on the receiving side, the signals are processed by 1:16 demultiplexing and, after frame synchronization in each channel, the random patterns and the inverted random patterns are reconverted (descrambled) into the original A1 and A2 bytes.

Thus, according to the sixth embodiment, the first and second signals in either of each odd channel and each even channel are partly converted into random patterns, while the first and second signals of the other channels are converted into inverted random patterns, hence reducing the number of successive same codes and diminishing the deviation of the mark rate as well. Due to the conversion mentioned above, the mark rate can be rendered substantially steady to 0.5. Moreover, in the sixth embodiment, 16-bit random patterns are not produced after 40-Gbps multiplexing, and the patterns obtained therein are such that "1/0" alternating signals and "0/1" alternating signals appear randomly, whereby the number of successive same codes can be further reduced.

Figure 18:
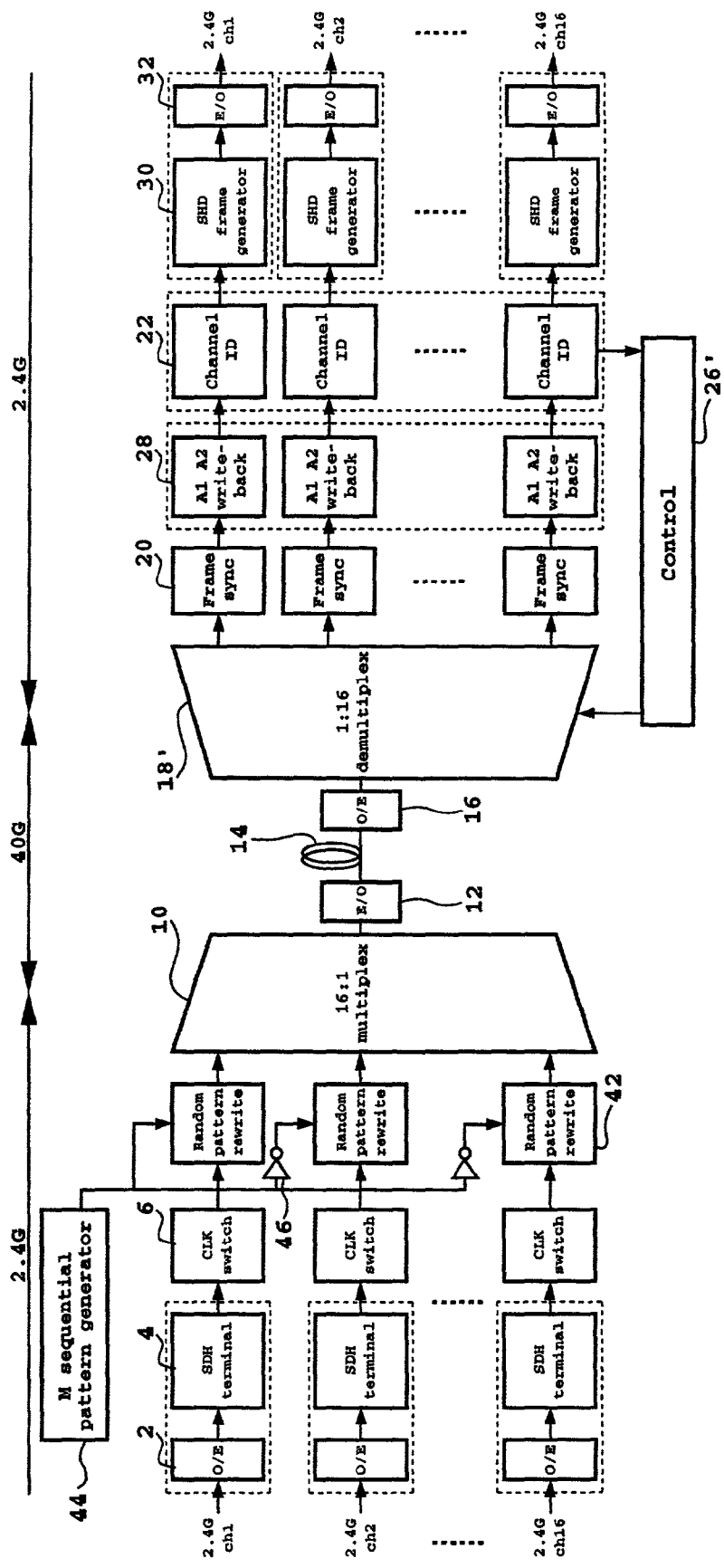
FIG. 18 is a block diagram of a substitute for the hardware shown in FIG. 17.

Referring next to FIG. 18, there is shown the structure of a substitute for the hardware shown in FIG. 17. In comparison with the hardware of FIG. 16, an inverter 46 is provided additionally between a random pattern rewrite circuit 42 for each even channel and an M sequential pattern generator circuit 44. Therefore, according to the structure shown in FIG. 18, it becomes possible to easily carry out the time-division multiplexing method represented by the sixth embodiment of the present invention. Further, the shift matrix circuit 24 shown in FIG. 17 is rendered no longer necessary to consequently simplify the structure.

Figure 19:
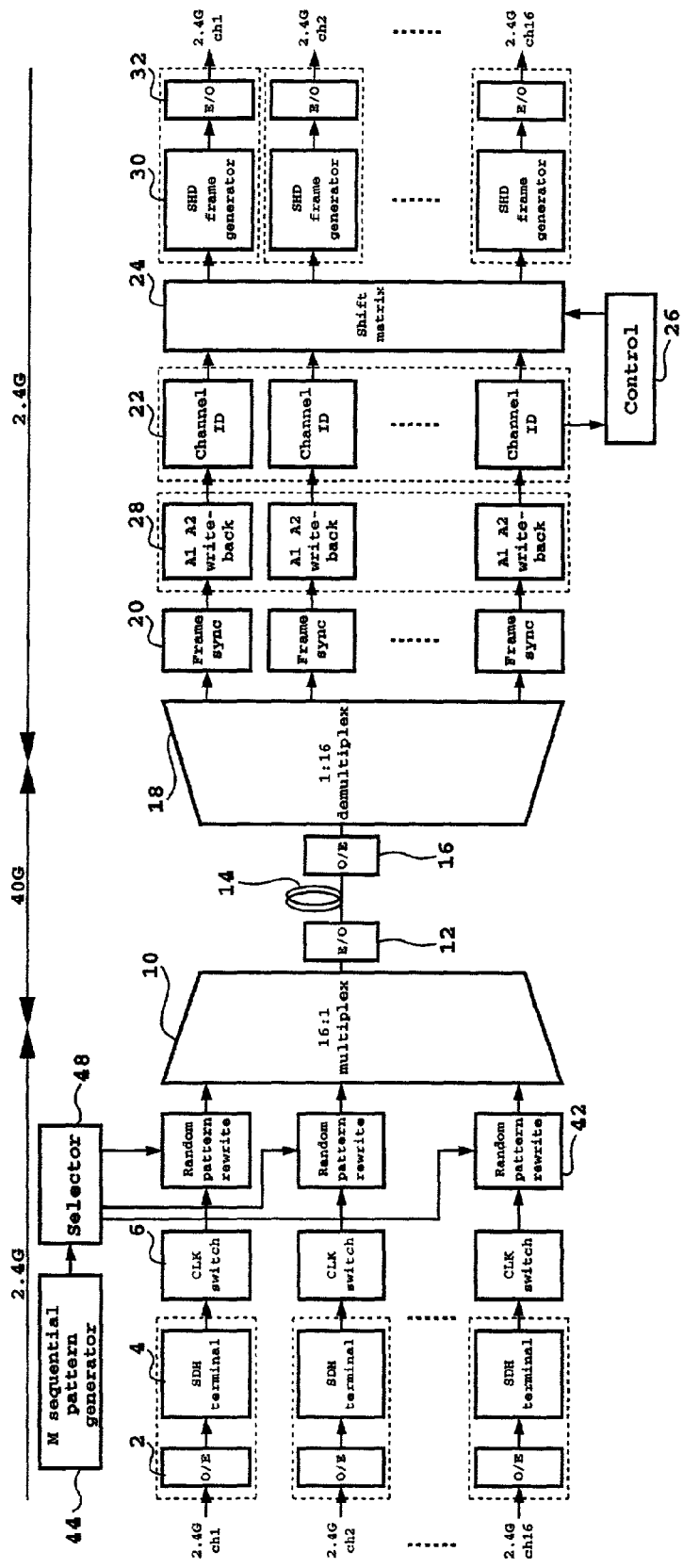
FIG. 19 is a block diagram of hardware adapted to carry out a seventh embodiment of the method conforming with the present invention.

Referring now to FIG. 19, there is shown another example of hardware adapted to carry out a seventh embodiment which represents the method of the present invention. In comparison with the hardware of FIG. 15, a selector 48 is provided additionally between a random pattern rewrite circuit 42 and an M sequential pattern generator circuit 44.

A random pattern is generated in the seventh embodiment, and one period of the random pattern is divided by the number (16) of channels to thereby produce a plurality of different random patterns. Subsequently, a plurality of first signals (48 A1 bytes) and a plurality of second signals (48 A2 bytes) in such channels are partly converted into the plural different random patterns respectively. More specifically, according to the hardware shown in FIG. 19, 46 A1 bytes unnecessary in each channel for frame synchronization are converted into each of plural different random patterns, and 46 A2 bytes unnecessary in each channel for frame synchronization are converted also into each of plural different random patterns. After such conversion, the low speed signals of 16 channels are time-division multiplexed by bit interleave, and high speed signals obtained as a result are transmitted via an optical fiber transmission line 14. Then on the receiving side, the signals are processed by 1:16 demultiplexing and, after frame synchronization in each channel, the random patterns are reconverted (descrambled) into the original A1 and A2 bytes.

Thus, according to the seventh embodiment, the first and second signals in each channel are partly converted into each of the plural different random patterns, hence reducing the number of successive same code and diminishing the deviation of the mark rate as well. Due to the conversion mentioned above, the mark rate can be rendered substantially steady to 0.5. Moreover, in this embodiment, one period of the original random pattern is divided by the number of channels to obtain a plurality of different random patterns, whereby the number of successive same codes can be further reduced.

Figure 20:
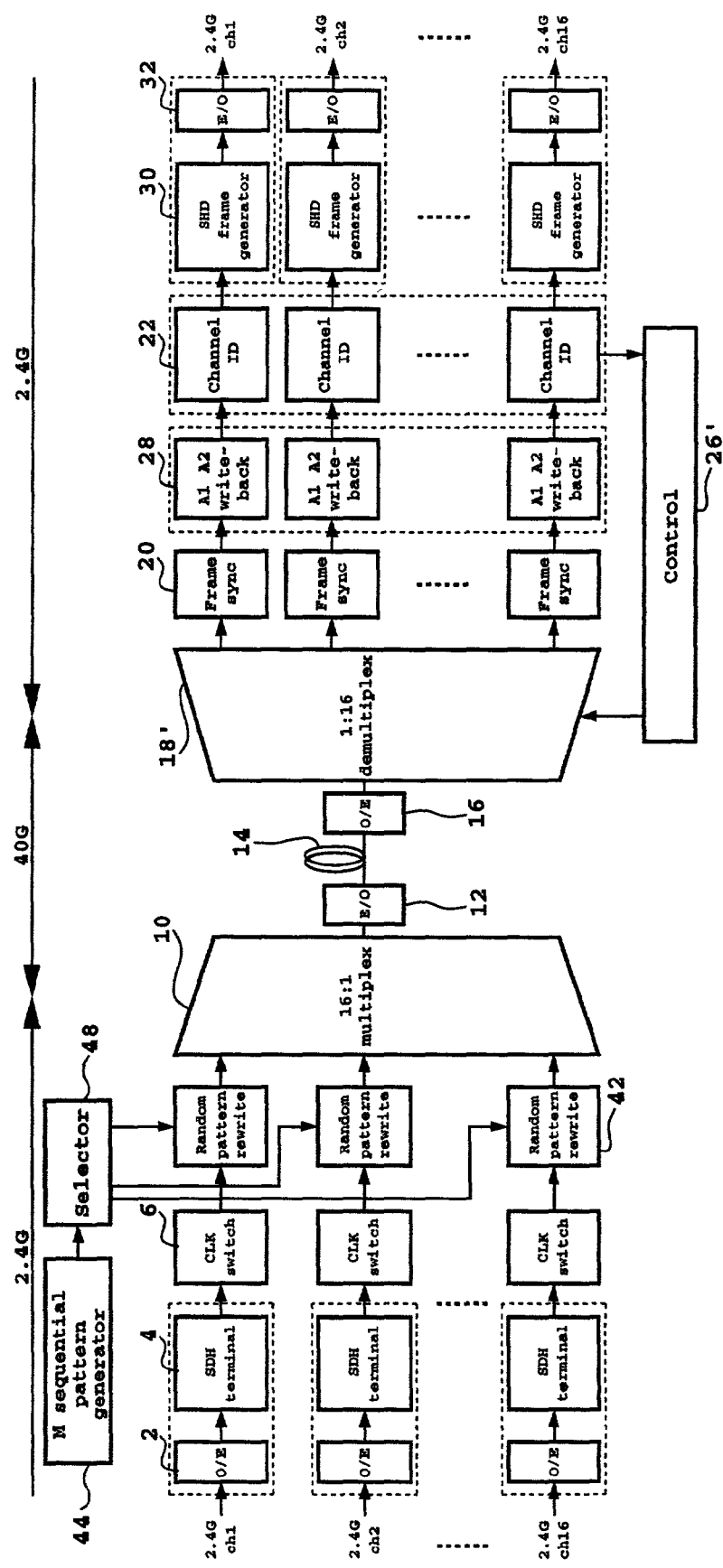
FIG. 20 is a block diagram of a substitute for the hardware shown in FIG. 19.

Referring next to FIG. 20, there is shown the structure of a substitute for the hardware shown in FIG. 19. In comparison with the hardware of FIG. 16, a selector 48 is provided additionally between a random pattern rewrite circuit 42 and an M sequential pattern generator circuit 44. Therefore, according to the structure shown in FIG. 20, it becomes possible to easily carry out the time-division multiplexing method represented by the seventh embodiment of the present invention. Further, the shift matrix circuit 24 shown in FIG. 19 is rendered no longer necessary to consequently simplify the structure.

Figure 21:
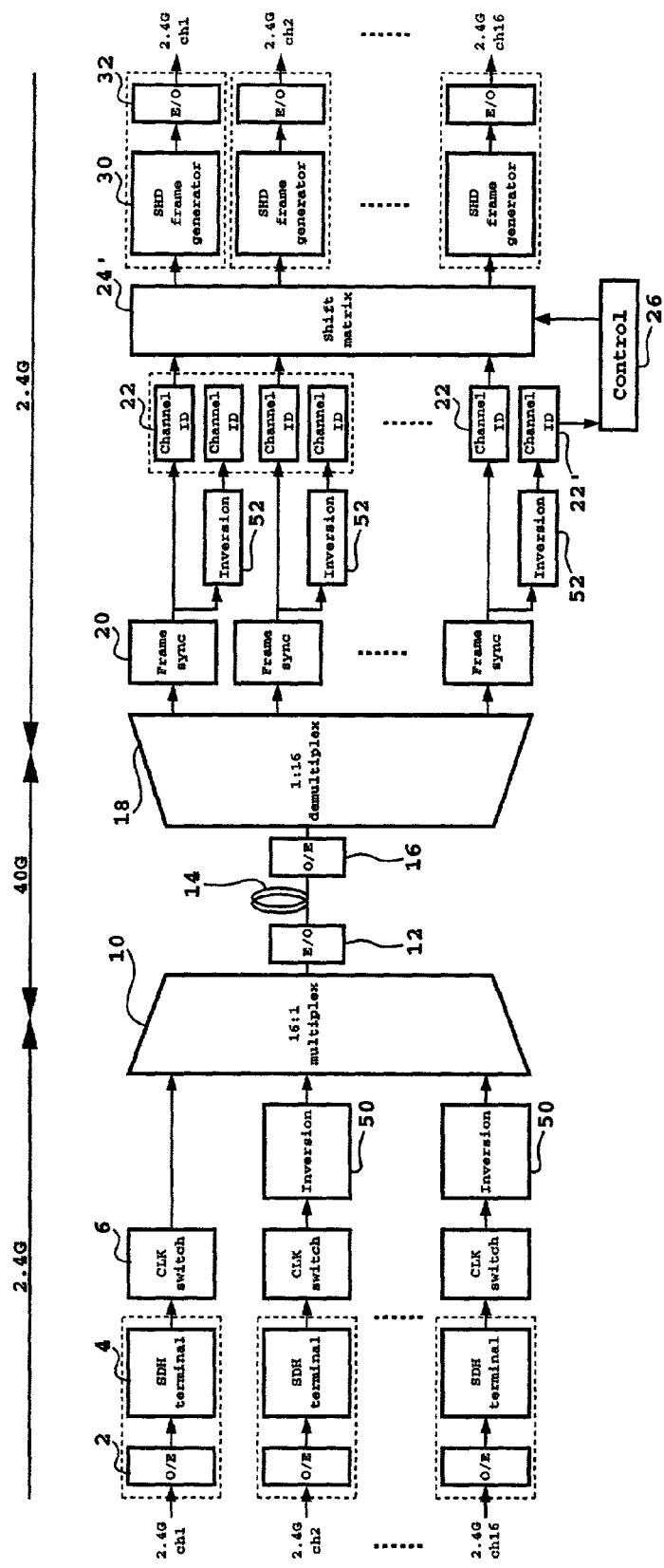
FIG. 21 is a block diagram of hardware adapted to carry out an eighth embodiment of the method conforming with the present invention.

Referring now to FIG. 21, there is shown another example of hardware adapted to carry out an eighth embodiment which represents the method of the present invention. In comparison with the hardware of FIG. 14 where a plurality of first signals (48 A1 bytes) and a plurality of second signals (48 A2 bytes) in either of each odd channel and each even channel of 2.4-Gbps low speed signals are partly converted into inverted signals by the A1, A2 inverting circuit 40, an inverting circuit 50 in this embodiment inverts the entire first and second signals in either of each odd channel and each even channel into inverted signals. More specifically, the inverting circuit 50 inverts the entire bits of the A1 and A2 bytes in each even channel regardless of whether such bits are necessary or not for frame synchronization, and then executes 16:1 multiplexing by bit interleave to consequently obtain 40-Gbps high speed signals.

As a result, the areas of the A1 and A2 bytes contain alternating patterns each composed of 16 "1/0" and "0/1" alternating bits corresponding to "1" and "0" patterns of the original A1 and A2 bytes, hence reducing the number of successive same code and diminishing the deviation of the mark rate. However, since it is impossible in this state to attain frame synchronization on the receiving side, an inverting circuit 52 is provided to generate inverted data also on the basis of the output of the frame synchronizing circuit 20, thereby generating a total of 32 channels which are composed of 16 channels of non-inverted data and 16 channels of inverted data. The non-inverted data of 16 channels are supplied via a channel identification circuit 22 to a shift matrix circuit 24', while the inverted data of 16 channels are supplied via a channel identification circuit 22 to the shift matrix circuit 24'. A control circuit 26 controls the shift matrix circuit 24' in accordance with the sub outputs of the channel identification circuits 22 and 22'.

Figure 22:
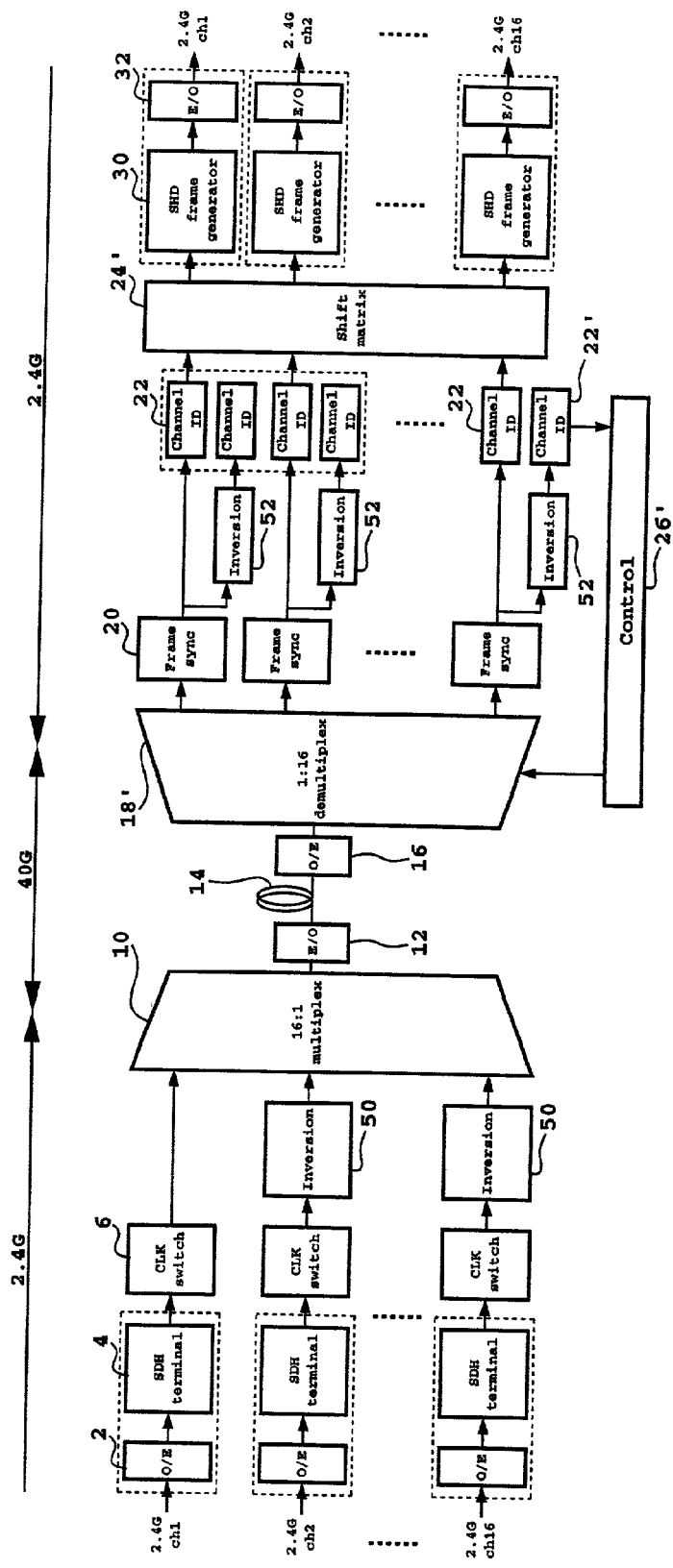
FIG. 22 is a block diagram of a substitute for the hardware shown in FIG. 21.

Referring finally to FIG. 22, there is shown the structure of a substitute for the hardware shown in FIG. 21. In this structure, the channel identification result obtained from the sub outputs of channel identification circuits 22 and 22' is fed back by a control circuit 26' to a demultiplexer 18', and the low speed signals of each channel outputted from the demultiplexer 18' are delivered from the output port of the predetermined relevant demultiplexer 18'. Consequently, the shift matrix circuit 24 shown in FIG. 4 is rendered no longer necessary to further simplify the structure.

According to the present invention, as described hereinabove, there can be provided a time-division multiplexing method which is capable of reducing the number of successive same codes and diminishing the deviation of the mark rate. For example, it becomes possible, by the application of the present invention, to realize a high transmission rate of 40 Gpbs by time-division multiplexing 2.4-Gbps (STM-16) SDH signals of 16 channels.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A time-division bit-interleave multiplexing method comprising:
    (a) a step of generating a plurality of first signals and a plurality of second signals to set in a second area of a low speed frame different from a first area of said low speed frame used for frame synchronization, and said second area of said low speed frame not used for frame synchronization;
    (b) a step of generating low speed frames accommodating low speed signals of plural channels including said first and second signals and transmission signals;
    (c) a step of converting said first and second signals in said second area of each channel into either of "1/0" alternating signals, said "1/0" alternating signals being repeated patterns of bits "10", and "0/1" alternating signals, said "0/1" alternating signals being repeated patterns of bits "01"; and
    (d) a step of time-division bit-interleave multiplexing said low speed frames accommodating said low speed signals after said step (c), thereby producing a high speed frame accommodating high speed signals;
    wherein main reiteration pattern of a pattern concatenated by a first reiteration pattern of a bit '1' or a bit '0,' a reiteration number of times of the first reiteration pattern being a number of the plurality of channels, and a second reiteration pattern of a bit '0' or a bit '1,' the reiteration number of times of the second reiteration pattern being the number of the plurality of channels, is mapped to a third area of said high speed frame by bit-interleave, and a mark rate in said third area becomes 50%.

2. A time-division bit-interleave multiplexing method comprising:
    (a) a step of generating a plurality of first signals and a plurality of second signals to set in a second area of a low speed frame different from a first area of said low speed frame used for frame synchronization, and said second area of said low speed frame not used for frame synchronization;
    (b) a step of generating low speed frames accommodating low speed signals of plural channels including said first and second signals and transmission signals;
    (c) a step of converting said first and second signals in said second area of either of each odd channel and each even channel into "1/0" alternating signals, said "1/0" alternating signals being repeated patterns of bits "10", while converting said first and second signals in said second area of the other channels into "0/1" alternating signals, said "0/1" alternating signals being repeated patterns of bits "01"; and
    (d) a step of time-division bit-interleave multiplexing said low speed frames accommodating said low speed signals after said step (c), thereby producing a high speed frame accommodating high speed signals;
    wherein a main reiteration pattern of a pattern concatenated by a first reiteration pattern of bits '01,' a reiteration number of times of the first reiteration pattern being half of a number of the plurality of channels, and a second reiteration pattern of bits '10,' the number of reiteration times of the second reiteration pattern being half of the number of the plurality of channels, is mapped to a third area of said high speed frame by bit-interleave, and a mark rate in said third area becomes 50%.

3. A time-division bit-interleave multiplexing method comprising:
    (a) a step of generating a plurality of first signals and a plurality of second signals to set in a second area of a low speed frame different from a first area of said low speed frame used for frame synchronization, and said second area of said low speed frame not used for frame synchronization;
    (b) a step of generating low speed frames accommodating low speed signals of plural channels including said first and second signals and transmission signals;
    (c) a step of converting said first and second signals in said second area of either of each odd channel and each even channel into all "0" signals, while converting said first and second signals in said second area of the other channels into all "1" signals; and
    (d) a step of time-division bit-interleave multiplexing said low speed frames accommodating said low speed signals after said step (c), thereby producing a high speed frame accommodating high speed signals;
    wherein first reiteration pattern of a second reiteration pattern of '01' bits or '10' bits, a reiteration number of times of the second reiteration pattern being half of a number of the plurality of channels, is mapped to a third area of said high speed frame by bit-interleave, and a mark rate in said third area becomes 50%.

4. A time-division bit-interleave multiplexing method comprising:
    (a) a step of generating a plurality of first signals and a plurality of second signals to set in a second area of a low speed frame different from a first area of said low speed frame used for frame synchronization, and said second area of said low speed frame not used for frame synchronization;

(b) a step of generating low speed frames accommodating low speed signals of plural channels including said first and second signals and transmission signals;

(c) a step of converting said first and second signals in said second area of either of each odd channel and each even channel into inverted signals, and not converting said first and second signals in said second area of other of each odd channel and each even channel into inverted signals; and (d) a step of time-division bit-interleave multiplexing said low speed frames accommodating said low speed signals after said step (c), thereby producing a high speed frame accommodating high speed signals;

wherein a reiteration pattern of a pattern comprising a non-inverted signal bit or inverted signal bit of the second area of an odd channel and an inverted signal bit or a non-inverted signal bit corresponding to the second area of an even channel, where the non-inverted signal bit or the inverted signal bit of the odd channel is stored, is mapped to a third area of said high speed frame by bit-interleave, and a mark rate in said third area becomes 50%.

5. A time-division bit-interleave multiplexing method comprising:

(a) a step of generating a plurality of first signals and a plurality of second signals to which specific pulse trains for frame synchronization are allocated respectively;

(b) a step of generating low speed signals of plural channels including said first and second signals and transmission signals;

(c) a step of partly converting said first and second signals in each channel into random patterns; and (d) a step of time-division multiplexing said low speed signals after said step (c), thereby producing high speed signals.

6. A time-division bit-interleave multiplexing method comprising:

(a) a step of generating a plurality of first signals and a plurality of second signals to set in a second area of a low speed frame different from a first area of said low speed frame used for frame synchronization, and a second area of said low speed frame not used for frame synchronization;

(b) a step of generating low speed frames accommodating low speed signals of plural channels including said first and second signals and transmission signals;

(c) a step of converting said first and second signals in said second area of either of each odd channel and each even channel into random patterns as non-inverted random patterns, while converting said first and second signals in said second area of the other channels into inverted random patterns obtained by inverting said random patterns; and (d) a step of time-division bit-interleave multiplexing said low speed frames accommodating said low speed signals after said step (c), thereby producing a high speed frame accommodating high speed signals;

wherein a reiteration pattern of a pattern comprising each bit of the non-inverted random patterns or the inverted random pattern, stored in the second area of an odd channel and each bit of the inverted random patterns or the non-inverted random patterns stored in the second area of an even channel, corresponding to the second area of the odd channel where the each bit of the non-inverted random patterns or the inverted random patterns is stored, is mapped to a third area of said high speed frame by bit-interleave, and a mark rate in said third area becomes 50%.

7. A time-division bit-interleave multiplexing method comprising:

(a) a step of generating a plurality of first signals and a plurality of second signals to which specific pulse trains for frame synchronization are allocated respectively;

(b) a step of generating low speed signals of plural channels including said first and second signals and transmission signals;

(c) a step of generating a random pattern, and then dividing one period of said random pattern by the number of said plural channels, hence obtaining plural different random patterns;

(d) a step of partly converting said first and second signals in each channel into each of said plural different random patterns; and (e) a step of time-division multiplexing said low speed signals after said step (d), thereby producing high speed signals.

8. A time-division bit-interleave multiplexing method comprising:

(a) a step of generating a plurality of first signals and a plurality of second signals to which specific pulse trains for frame synchronization are allocated respectively in a first area and a second area of a low speed frame, said first area of said low speed frame being used for frame synchronization and said second area of said low speed frame not being used for frame synchronization;

(b) a step of generating low speed frames accommodating low speed signals of plural channels including said first and second signals and transmission signals;

(c) a step of entirely converting said first and second signals in either of each odd channel and each even channel into inverted signals, and not converting said first and second signals in other of each odd channel and each even channel into inverted signals as non inverted signals; and (d) a step of time-division bit-interleave multiplexing said low speed frames accommodating said low speed signals after said step (c), thereby producing a high speed frame accommodating high speed signals;

wherein a reiteration pattern of a pattern concatenated by each non-inverted signal bit or each inverted signal bit in the first and second areas of an odd channel and each inverted signal bit or each non-inverted signal bit stored in the first and second areas of an even channel, corresponding to the first and second areas of the odd channel where the each non-inverted signal bit or the each inverted signal bit is stored, is mapped to a third area of said high speed frame by bit-interleave, and a mark rate in said third area mapped becomes 50%.

* * * * *